(12) United States Patent
Hulan

(10) Patent No.: US 9,258,688 B2
(45) Date of Patent: Feb. 9, 2016

(54) ALERT DEVICE AND SYSTEM

(71) Applicant: Greg Hulan, Poway, CA (US)

(72) Inventor: Greg Hulan, Poway, CA (US)

( * ) Notice: Subject to any disclaimer, the term of this patent is extended or adjusted under 35 U.S.C. 154(b) by 102 days.

(21) Appl. No.: 14/158,345

(22) Filed: Jan. 17, 2014

(65) Prior Publication Data

US 2015/0208220 A1 Jul. 23, 2015

(51) Int. Cl.
*H04W 4/22* (2009.01)

(52) U.S. Cl.
CPC ...................................... *H04W 4/22* (2013.01)

(58) Field of Classification Search
CPC ....... H04W 4/22; H04W 76/007; H04W 4/14; H04M 11/04; H04M 11/045; H04M 2242/04
USPC ........................................... 455/404.1, 404.2
See application file for complete search history.

(56) References Cited

U.S. PATENT DOCUMENTS

| | | | |
|---|---|---|---|
| 5,878,354 A | 3/1999 | Hasegawa | |
| 5,960,367 A | 9/1999 | Kita | |
| 6,188,916 B1 | 2/2001 | Noda et al. | |
| 6,216,017 B1 | 4/2001 | Lee et al. | |
| 7,254,223 B1 | 8/2007 | Henderson | |
| 7,305,257 B2 | 12/2007 | Ladouceur et al. | |
| 7,586,418 B2 | 9/2009 | Cuddihy et al. | |
| 7,750,799 B2 | 7/2010 | Childress et al. | |
| 8,149,112 B2 | 4/2012 | Schlager et al. | |
| 8,359,000 B2 | 1/2013 | Fee | |
| 8,463,577 B2 | 6/2013 | Yuen et al. | |
| 8,532,609 B2 | 9/2013 | Spector | |
| 2001/0031622 A1 | 10/2001 | Kivela et al. | |
| 2008/0166992 A1 | 7/2008 | Ricordi et al. | |
| 2009/0040948 A1 | 2/2009 | Wengrovitz et al. | |
| 2011/0044436 A1 | 2/2011 | Tam et al. | |
| 2011/0053643 A1 | 3/2011 | Shmunis | |
| 2011/0057809 A1 | 3/2011 | Mahoney | |
| 2011/0171937 A1 | 7/2011 | Hill et al. | |
| 2011/0256842 A1 | 10/2011 | Spector | |
| 2012/0052833 A1 | 3/2012 | Pendse | |
| 2014/0120860 A1* | 5/2014 | Amis | 455/404.1 |
| 2015/0062352 A1* | 3/2015 | Lee et al. | 348/187 |
| 2015/0065082 A1* | 3/2015 | Sehgal | 455/404.2 |

FOREIGN PATENT DOCUMENTS

| | | |
|---|---|---|
| CN | 101141149 | 3/2008 |
| JP | WO0199450 | 12/2001 |

* cited by examiner

*Primary Examiner* — Marcos Torres
(74) *Attorney, Agent, or Firm* — Mark Wisnosky

(57) ABSTRACT

An alert device and methods of using the device in conjunction with a portable communication device are presented. The alert device is intended to be worn discretely on the person of the user and includes an output mechanism and user interface such that the user is notified of incoming communications received by a portable communication device, such as a cellular telephone, and may trigger the portable communication device to send pre-selected responses to those communications through interaction solely with the alert device. The alert device may further initiate pre-selected communications to be sent by the portable communication device solely through interaction with the alert device.

15 Claims, 16 Drawing Sheets

ALERT DEVICE AND SYSTEM

CROSS-REFERENCE TO RELATED APPLICATIONS

Not Applicable.

BACKGROUND OF THE INVENTION

1. Technical Field

The present invention relates to a device and system for providing notifications and alerts received and sent through a programmable cellular telephone or other portable communication device.

2. Related Background Art

Programmable cellular telephones are now a critical part of our daily lives. They are carried with us everywhere we go and we interact with them constantly for phone calls, text messages, emails and other forms of communication. However, users miss calls, texts, calendar appointments, and other notifications because they can't hear it ring. If carried in a purse, brief case or pocket a phone call or message alert from a ringing cell phone is often missed. Even if aware of the incoming call or message interacting with the cell phone to reply or just silence the ringing is often impaired. Driving a car, participating in a meeting, having a face to face conversation or attending a theatrical or other entertainment event create situations where interacting with one's cell phone is difficult.

Missed notifications happen in loud environments, like at the mall, or driving a car. But also in quite environments when the ringer is turned off to avoid interruptions like at work meetings, or church. And often, afterwards calls and incoming messages are missed because the user forgets to turn the cell phone ringer back on after being silenced. Another reason for missing texts is being away from the phone. This happens at home where the user is in one room and the phone is in another.

There are also no known devices that allow the user to send and receive a communication discretely. That is they can send a message and receive a notice of a received message even when amongst others without the others knowing the message has been sent or received.

Notification devices that are wirelessly connected to a cell phone have recently come into the market. These devices are generally capable of vibration or other alert when a phone call or message arrives. However there are no devices currently available that provide for two-way communication such that the user of the device can provide a preselected response to the call or message with a push of a button on the device located remotely from the cell phone and discretely worn by the user. There are no devices that can provide a range of emergency alerts tailored to the situation. There are no devices that provide an alert system through the cell phone that can provide a variety of alerts and actions pre-selected on setup and then discretely activated with a user interface on the device remote from the cell phone. Although there are systems designed to call an emergency number such as 911 there are no known systems that will contact a network of preselected associates when help is needed or other communications are desired. There is a need for device that can provide an alert to a user when a communication is received on their cell phone and that provides a variety of responses that can be pre-programmed in the cell phone and that are initiated through interaction with the device while still remote from the cell phone. There is a need for a device that can initiate an emergency alert protocol on the cell phone while the device is remote from the cell phone. There is a need for a device to send communications and receive notice of communications discretely.

DISCLOSURE OF THE INVENTION

The invention addresses the shortcomings of the present system by providing a device, system and methods for notifying a user of an incoming communication on their cell phone with the notification being through a device remote from the cell phone but communicating wirelessly with the cell phone. In the preferred embodiment the communication between the alert device and the cell phone uses wireless technology such as that specified under Bluetooth® technology (Bluetooth is a registered certification mark of Bluetooth Sig, Inc. a Delaware corporation). The alert device further includes communication back to the cell phone and interacts through an application running on the cell phone to trigger responses to an incoming communication or to provide a means to initiate a communication from the alert device. In one embodiment the user interface is a set of push buttons. The alert device communicates to the user that the cell phone has received a communication. In one embodiment the communication is through a vibration. The communication to the user through the alert device is programmed to be specific to the type of communication received. The alert for a phone call is different that the alert for a text message or an email message. The alert is also selectable for the identity of the caller and the type of message. An emergency alert where a second person is seeking emergency aid is distinguishable from a routine phone call or other non-emergency communication. In another embodiment pre-selected responses are sent. In one embodiment the responses are specific to the type of received communication and the identified sender of the communication. Similarly alerts sent from the device can be specific to a receiving audience and the message can be tailored to each recipient. The device and system further provides for acknowledgments so that the sender is informed that the message was successfully sent.

In another embodiment the system includes encoding a chain of friends or pre-selected interconnected users. Each user using an alert device, a cell phone and an alert application operating on each of the cell phones to provide emergency support to one another. In one embodiment the system is programmed to broadcast an emergency alert initiated by a first user on their alert device and sent to all users in their chain of friends or supporters. In another embodiment the system is programmed to send an alert sequentially to preselected users. In another embodiment the device sends an alert to a first user and then will selectively send to the next user in the chain depending upon whether a confirmation is received or not. In another embodiment the system uses a global positioning system to determine the position of all users in an interconnected group and when a single user sends an alert the alert is sent to the nearest other user in the group. In another embodiment the alert is sent sequentially to users from nearest to furthest away. In another embodiment the alert is sent to the nearest other user in the group and if the user does not respond or sends a negative response the alert is sent to the second nearest user and so forth. In another embodiment a series of emergency alerts are programmed each alert an escalation of the previous if no response or a negative response is received. In one embodiment the sequence of alerts is first a text message to a user or users, followed by a phone call to a user or a series of phone calls to a group of users and again if a negative or no response is received the alert is escalated to a 911 emergency call. In another embodiment interconnected users may include users that communicate through a personal computer or tablet connected through the Internet to the other users. Such a user could be part of the interconnected group without the need for a cellular phone device.

Another embodiment includes alert procedures for using the system to find a lost device or cell phone.

Another embodiment includes the set up procedures where interconnected user groups are selected and confirmed and where pre-selected alerts, response and actions are defined.

MODES FOR CARRYING OUT THE INVENTION

Figure 1:
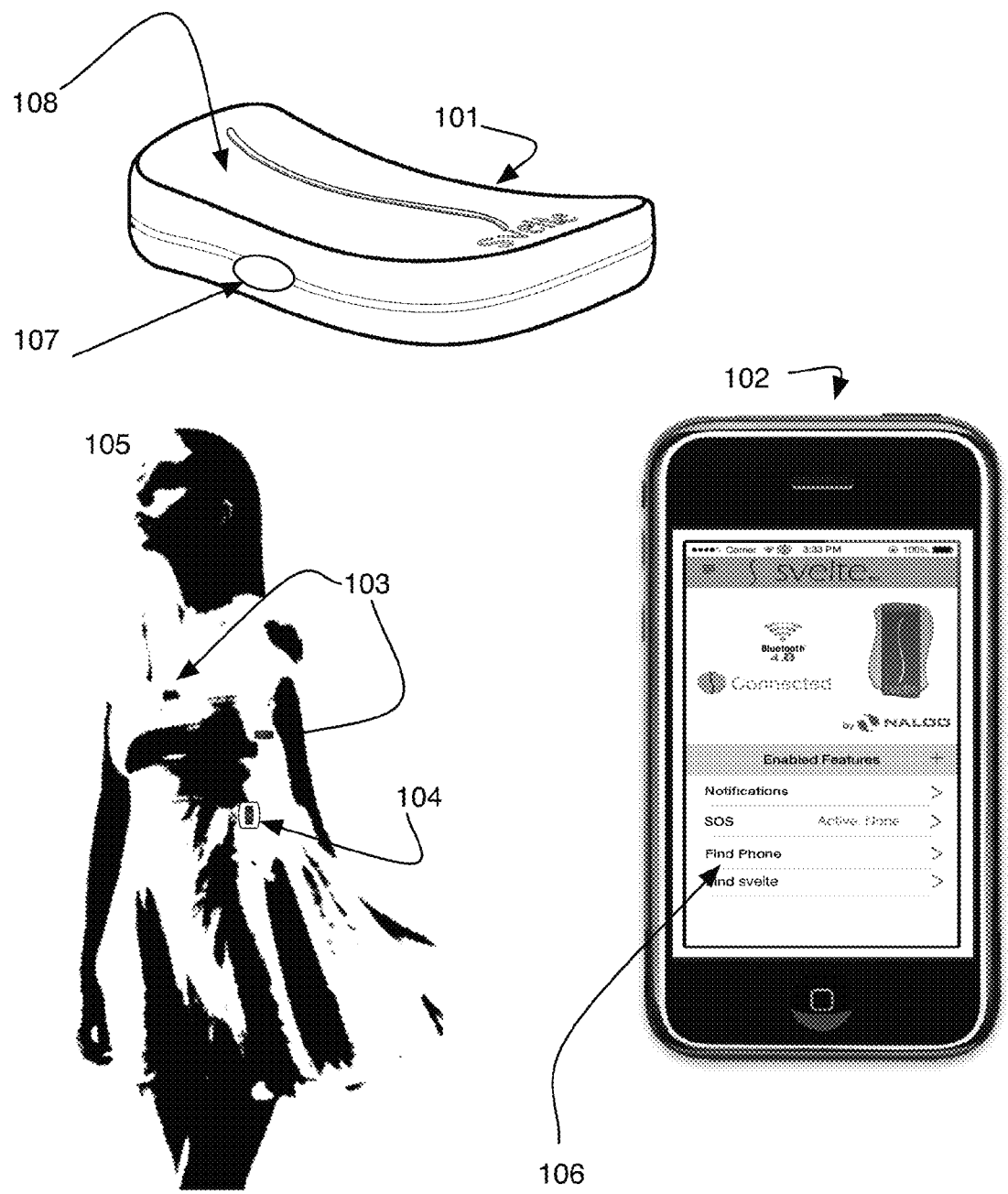
FIG. 1 is a block diagram of a system for practicing the invention.
Figure 2:
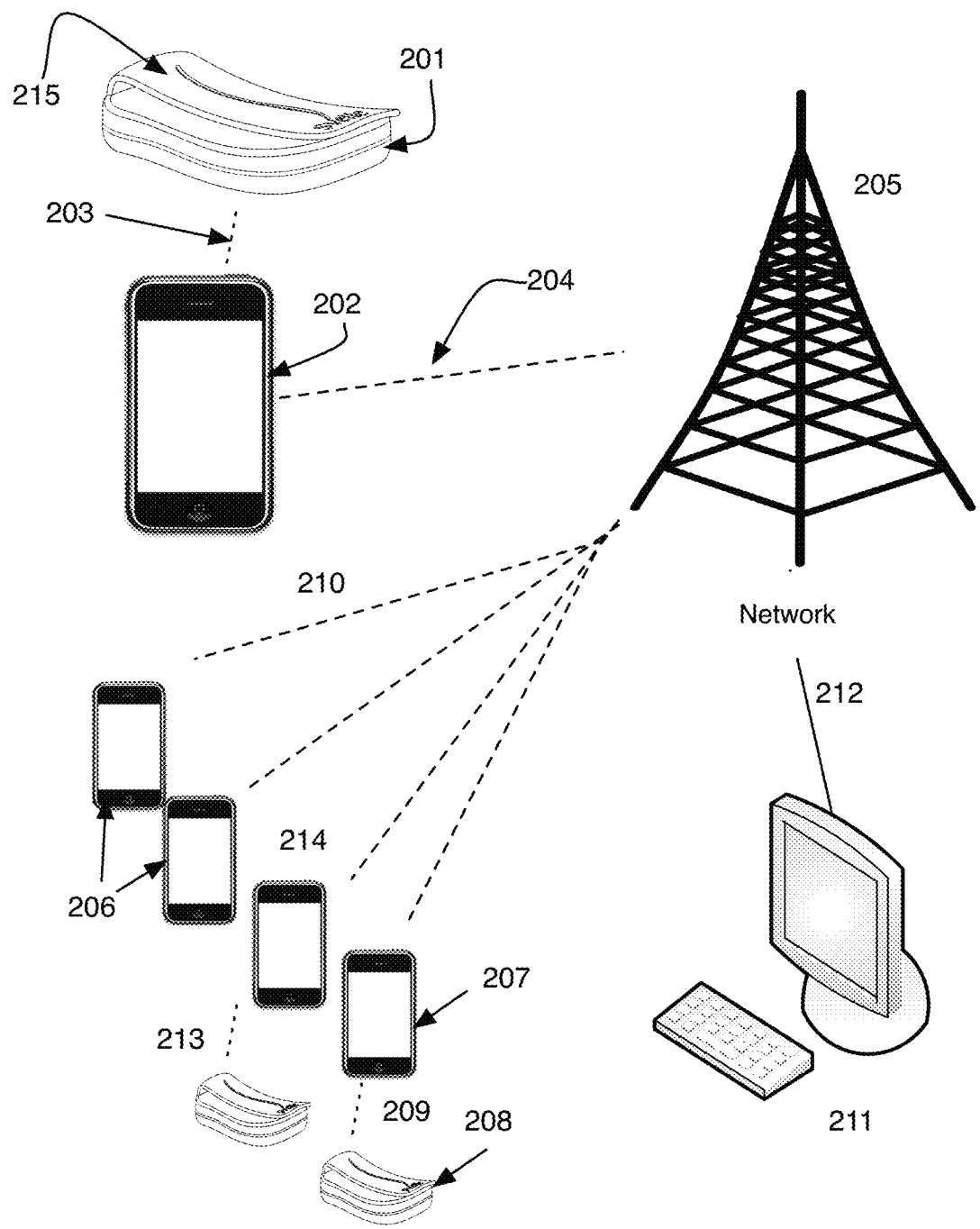
FIG. 2 is block diagram showing multiple users in a system.

Referring now to FIG. 1, a block diagram of a system for practicing the invention is shown. The system is comprised of an alert device 101 and a programmable portable communication device 102. Non-limiting examples of a portable communication device include a cell phone, tablet computer and personal computer, any of which includes connections for communication to others. Connections include wired through a network and wireless through the Internet, a Wi-Fi network and through a cellular network. In the preferred embodiment the portable communication device is a smartphone. The alert device is worn on the person of a user 105. In the preferred embodiment the alert device is worn under clothing and placed for example under a bra or bra strap 103 or elsewhere on the person 104. Although shown as visible in use the preferred placement is under outer clothing such that the alert device cannot be seen and is in intimate contact with the user such that they can feel the alert device vibrate. The portable communication device includes memory, a processor, display and user interface all as known in the art. The memory includes a program that runs on the processor and includes programmed steps, described more fully below, for communicating with the alert device 101. The alert device 101 further includes a user interface 107. Non-limiting examples of a user interface include buttons, switches, lights, speakers, buzzers and vibrating devices. In the preferred embodiment the user interface on the alert device 101 includes a button or set of buttons 107 and a vibrating component (not shown). The surface 108 of the device is shaped so as to fit snugly against the contour of a users body and be hidden from view when worn under garments as shown in Figure. In a preferred embodiment the alert device is sized and shaped to fit under a bra on the side of the user and the user interface 107 may be activated through the users clothing. The user interface 107 is shown on a side edge of the device but in practice may be located on any surface of the alert device that can be accessed by the user when worn. The surface 108 of the alert device is replaceable to allow an interchange of attachment mechanisms. In FIG. 1 the surface is smooth and the configuration is intended to be worn in direct contact with the user's body. In FIG. 2, the surface has been replaced with one that incorporates a clip 215 such that the alert device may be clipped to the user's clothing. The surface may be further replaced other surfaces that include a variety of attachment mechanisms, nonlimiting examples include clips, lanyards and wrist bands.

FIG. 2 depicts means for using the alert device and associated system. An alert device 201 is connected 203 to a portable communication device 202. The portable communication device is connected 204 to a network 205. Also connected 210 to the network are a plurality of other portable communication devices 206, 207 are paired with alert devices 208, 213 and are interconnected 209. In a preferred embodiment the interconnection is through a wireless pairing using Bluetooth® technology. In another embodiment the system further includes a personal computer 211 connected 212 to the network to enable communication with the other portable communication devices 202, 206, 207. The portable communication devices 202, 206, 207 further include a program running on the internal processor that activates and is activated by the alert device 201. In one embodiment the alert device is activated by its paired portable communication device on incoming communication and vibrates or otherwise signals the user that there is an incoming communication. In one embodiment the signal is unique to the sender of the communication received by the portable communication device. That is analogous to unique ring tones assigned to callers as are known in the art to be used on cell phones the alert device may vibrate in different patterns depending upon the originator of a call to its pair communication device. In another embodiment the user interface on the alert device when activated will cause a signal to be sent to its paired communication device that in turn responds to that signal with a pre-selected action. Non-limiting examples of the pre-selected action of the communication device from a prompt by the alert device include: sending a text message to a particular person or group of people, dialing a pre-selected phone number, sending a pre-recorded phone message to a person or group of people, sending an email to a particular person or group of people and sending an emergency alert such as dialing an emergency number such as 911. In another embodiment the communication device is programmed to complete a sequence of actions including communication with a plurality of pre-selected users of the system. In one embodiment the sequence of actions includes communication with a first person, followed by communication with a second person and so forth. In another embodiment the sequence includes communication to a first person, waiting for a confirming response that the communication has been received and then conditionally to a second user, waiting for a response that the communication has been received by the second user and then conditionally communicating to a third user and so forth. In one embodiment the confirming response further includes a confirmation that the receiving user will take some action. A non-limiting example of action includes going to the location to aid the first person that initiated the communication through their alert device. In another embodiment the communication includes the location of the person initiating the communication. In another embodiment the communication is sent sequentially to a plurality of user where the sequence is determined by their location and distance from the first person.

Another embodiment includes a system and method of use by group of users. Referring again to FIG. 2, a group of users (the users not shown) are users of the devices shown. A user may operate an alert device and a communication device that are paired 201, 202 and 207, 209 and 213, 214. A user may also use just a communication device 206 without a paired alert device or in another embodiment a user may use a personal computing device 211. All the devices are interconnected through a network such that the devices may send communications to one another. The communications may be cellular phone calls, voice over Internet protocol communications, instant text message communications, electronic mail communications, communication through a website via a server that will initiate communications and track locations and communications between an application running on a portable communication device and a server. The communication devices 202, 207, 214 are each paired with an alert device 201, 208, 213. The communication devices 202, 207, 214 that are connected to an alert device include a program to send and receive communication to their paired alert device. A setup program is used to define all the members of the communication group or communication chain and their roles. Roles include for example for each of the user which other user in the communication chain should first be contacted in an emergency situation, which should be contacted second and so forth. Roles further include other communication actions that may be initiated by the alert device through the paired communication device. A non limiting example could be that upon receiving a cellular phone call communication from another member of the communication group an activation of the alert device may send a text message to a first member or if the cellular communication is from a second member action of the alert device may cause the communication device to send an email to a second member and activation upon receiving a cellular communication from a third member may cause the communication to be ignored. Roles include definition of programmed responses dependent upon the identity of the sender of the first communication. In another embodiment roles include communications that are initiated by the alert device. Non-limiting examples include the emergency responses as already discussed above. Roles may include communications that are specific to those members of the group that use an alert device or those members of the communication group that do not use an alert device or those members of the communication group that do not use a telephone communication device such as the member 211 who communicates through use of a personal computer. In the latter case the communication may be an electronic email, voice over Internet protocol phone call or a text message as opposed to a cellular phone call. Note that in another embodiment the members of a communication group includes those members that are using a alert device in conjunction with a communication device (201, 202 and 207, 208 and 213, 214), members that are using a portable communication device and no alert device (206), and, users that are using a personal computing device 211. In another embodiment users may further include users (not shown) who are using a landline telephone device. The setup procedure, described below, defines the appropriate communication protocol to be used with a user dependent upon the type of communication device they are using. Those members that are using an alert device in conjunction with a communication device (201, 202 and 207, 208 and 213, 214) further include a program to control the communication between the alert device and the communication device and between the communication device and other users through the network 205. Those members that are using a portable communication device 206 but no alert device may have different settings for roles. Similarly those users using a personal computer 211 and no alert device and no portable communication device will have still different roles and communication parameters set.

Figure 3:
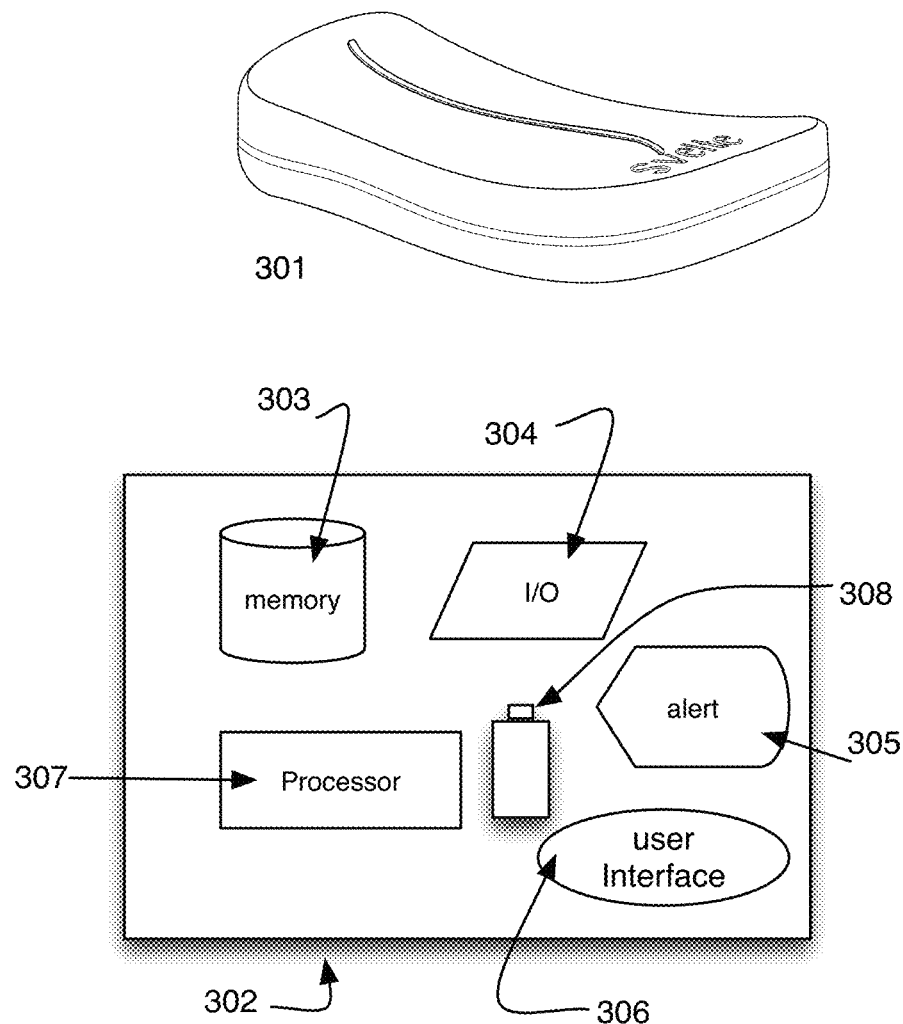
FIG. 3 is a block diagram of more details of the alert device.

Referring now to FIG. 3, the components of the alert device 301 are shown. The internal components 302 of the alert device 301 are comprised of computer memory 303 to store programs to operate the alert device and store settings and parameters, a processor 307 to operate the alert device input and output devices 304 to allow the alert device to communicate wirelessly with the portable communication devices, a user interface 306 to allow the user to interact with the alert device to send alerts and respond to incoming communication, and, an alert mechanism 305 that can alert the user that incoming communication has been received and a electrical power supply 308 to provide power to the other components of the system. Non-limiting examples of the user interface include buttons, sliders and touch sensitive display screens. Non-limiting examples of the alert mechanisms includes buzzers, speakers, vibrating devices, lights and display screens. In the preferred embodiment the I/O mechanism 304 uses Bluetooth® communication protocol. Non-limiting examples of the I/O mechanism include networking circuits that can communicate both wired and wirelessly, a universal serial bus (USB) port, and a cellular communication circuit. In the preferred embodiment the power supply 308 is a battery.

Figure 4:
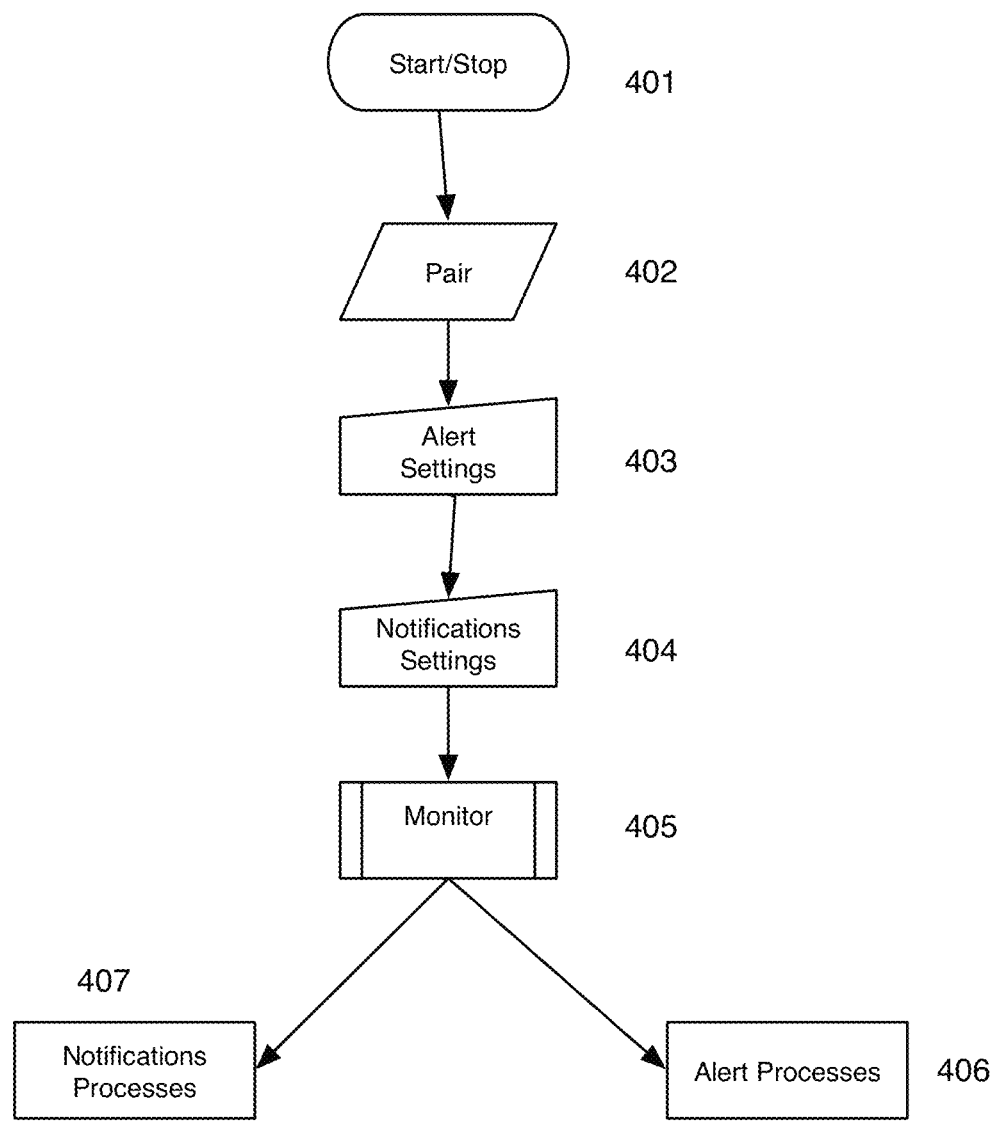
FIG. 4 is a flow chart for an overview of using the system.

The remaining Figures include methods of operations of the alert device in conjunction with a portable communication device and connected to a communication network. Starting with FIG. 4 a high level overview of using the system is shown. The process steps are shown as occurring sequentially in the following Figures, however it should be understood that the sequence can be reordered to the same effect and that many of the process steps will occur simultaneously. The processes start 401 with powering the alert device. Powering may include installing a battery and switching the device on or charging the internal battery or activating the user interface in a way that is encoded for initiating the startup routines. The device is then paired 402 with a communication device. In the preferred embodiment the communication device is a portable communication device such as a cellular telephone that includes a programmable computer processor. Also in the preferred embodiment the pairing results in a unique pairing with the alert to device to a single portable communication device such that the alert device receives communication alerts from and sends control signals to a single portable communication device. The next steps are to set up protocols for operation of the alert device in conjunction with a portable communication device. The protocols include alert settings 403 that define the control steps of how the alert device responds to user interactions on the alert device through the user interface of the alert device. Non-limiting examples include pressing a particular button a pre-selected number of times could result in a signal to be sent to the portable communication device and initiating programmed steps to send a text message to a particular recipient or group of recipients. Another example includes pressing a different button or sequence of buttons in the user interface on the alert device sends a signal to the portable communication device to place a telephone call to a particular pre-selected person. In another embodiment the alert settings trigger a series of messages to be sent to a communication group. Alert settings also include selection of the communication group. Alert settings also include encoding a particular interaction with the alert device to send an emergency request for help. The emergency request for help may include dialing an emergency number such as 911 on the portable communication device. Alert settings 403 in general mean settings that define what signals are sent from the alert device to a portable communication device in respond to particular interactions of the user with the user interface on the alert device. Notification settings 404 by contrast mean settings as to how the alert device should react for a given signal sent from the portable communication device. Non-limiting examples of notification settings include selecting particular alert to be activated on the alert device based upon at least one selected from the identification of a caller or sender of a communication to the portable communication device paired with the alert device, the nature of the communication, i.e. is it a text message, email message or phone call, the urgency of a message. In the preferred embodiment the notification settings and alert setting are set using a program that is running on the portable communication device that is paired with the alert device. The alert settings and notification setting processes also include uploading the settings to the memory on the alert device and thereby programming the alert device to respond in pre-selected ways on the user interface on the alert device being activated and upon receiving communication notifications from the portable communication device. The next step in the general process is to monitor 405 for activation of the alert device by the user 406 and notifications from the portable communication device. Monitor implies actions on both the alert device, waiting for communication signals from the portable communication device, and actions on the portable communication device, waiting for signals from the alert device as well as waiting for communications from other networked communication devices that have been pre-selected in the settings to trigger particular actions. Particular actions include sending signals to the alert device to trigger the alert device to notify the user through an action by the alert mechanism. Particular actions also include suppression of notification of the user such that only a message is recorded for later action.

Figure 5:
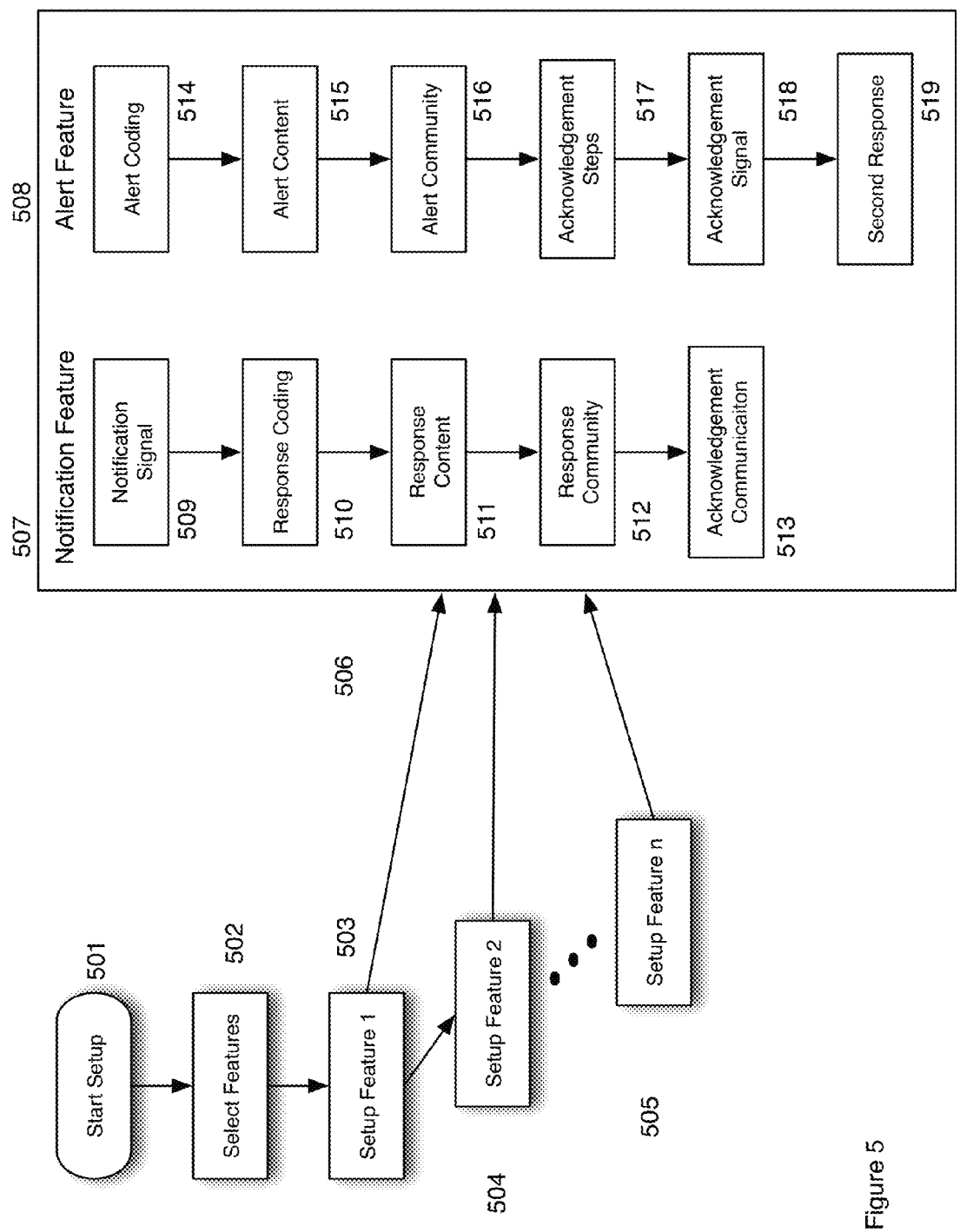
FIG. 5 is a flow chart for set up methods use of the system.

FIG. 5 shows a diagram representing steps in the setup process to define settings for notification features and for alert features. As in FIG. 4 the process is initiated 501. Initiation 501 can happen through an action on the alert device or by an action on the portable communication device or by an action on a personal computer if that is the device of choice for the particular user. The user selects features 502 to be included for alerts and notifications. Notification features include responding to particular phone calls, responding to text messages and responding to emails. Alert features include encoding the alert device to send an emergency signal that activates the portable communication device to for example dial 911, encoding the alert device to send a signal that triggers the portable communication device to send a text message to a particular user, and encoding the alert device to send a signal to the portable communication device to acknowledge receipt of an alert signal triggered by another user of a different portable communication device. Setup requires defining settings and programming responses for both the alert device and the portable communication device paired with the alert device. For each feature selected a setup procedure 503, 504, 505 is initiated until all of the selected features have been set up. The setup procedures 506 include setup procedures if the feature is a notification feature 507 and procedures for alert features 508. Considering first the notification features 507, the steps include selection of a notification signal 509. The notification signal is an alert signal activated on the alert device when a particular communication is received by the portable communication device. In one embodiment the alert signal includes a frequency of vibration that is triggered on the alert device and a pattern of vibrations. In one embodiment a low frequency vibration can indicate an incoming email message, a medium frequency vibration can indicate an incoming text message and a high frequency vibration can indicate a phone call all received by the portable communication device. The alert signal can further include patterns of vibrations that are indicative of a particular sender of the communication or indicative of the urgency of the communication. If the alert component is an optical device rather than a vibrating device the alert signal may be encode to display a particular patterns of lights, colors of lights or particular images or patterns of images if the alert mechanism is a display screen. The notification feature further includes coding of a response 510 to a particular communication. In one embodiment the response is triggered by the user activating the alert device upon receiving notification of the communication through the alert device. The response coding may includes sending a signal to the portable communication device to cause it to send a response to the sender of a communication that the recipient is busy and cannot answer the phone, or sending a particular text message selected on the basis of the type of communication and the sender of the communication. The content of the response is coded 511 for each notification feature for which a particular response is selected. Also included in setting a notification feature is the definition of a response community 512. The response community in the case of a notification feature includes a selected group of people who wish to be notified when the user receives a particular communication. The selection of the response community further includes defining the means to contact each member of the community for the particular response notification to be sent. Non-limiting examples of the means to contact includes the community member's phone number, or email address as well as the selection of the preference to send a pre-recorded phone message, a pre-selected text message or an email. In one embodiment defining the response community further includes sending a confirmation message to each community member by their selected means of communication and recording the setting only upon receipt of a confirmatory response that they wish to receive such acknowledgment communication 513.

If the selected feature is an alert feature the setup procedure follows the second path 508. An alert is defined here as a signal originating in the alert device that is sent to a portable communication device paired with the alert device. Setup includes coding the alert 514 to be sent. Coding means defining the steps in the user interface on the alert device that will trigger a particular signal to the paired portable communication device and cause the program running on the portable communication device to take a particular action upon receipt of the signal. In one example coding the alert includes defining a sequence of button pushes on the alert device user interface that will cause the portable communication device to send a text message to a selected user or group of users. In another example the user selects a sequence, duration or combination of buttons to push to cause the alert device to send a signal to the portable communication device which through the encoded program running on the portable communication device results in it calling a particular phone number. In one embodiment the encoding causes the portable communication device to dial 911. In another embodiment the encoding causes the portable communication device to activate a speakerphone mode before dialing the particular phone number. The alert feature setup further includes defining the content for an alert feature 515. The alert content includes the particular text message or pre-recorded phone message, or text for an email to be sent by the portable communication device that is associated with a selected user interaction with the user interface of the alert device. Setting up the alert content involves both defining the content and establishing the link to a particular signal received from the alert device. The signal is dependent upon the interaction of the user with the alert device. Nonlimiting examples of interaction include pushing a particular button on the alert device for a given duration, for a number of times, pushing a series of buttons in a pre-selected sequence and pushing a set of buttons simultaneously. Set up further includes storing the content, the action to be taken and the associated signal that should trigger the action. Alert setup further includes defining an alert community 516. An alert community is a group of people who are users of the system and agree in advance to receive messages through the system and to respond to the messages. In one embodiment the responses are automatically sent based upon the setup procedure completed by each individual user.

Figure 6:
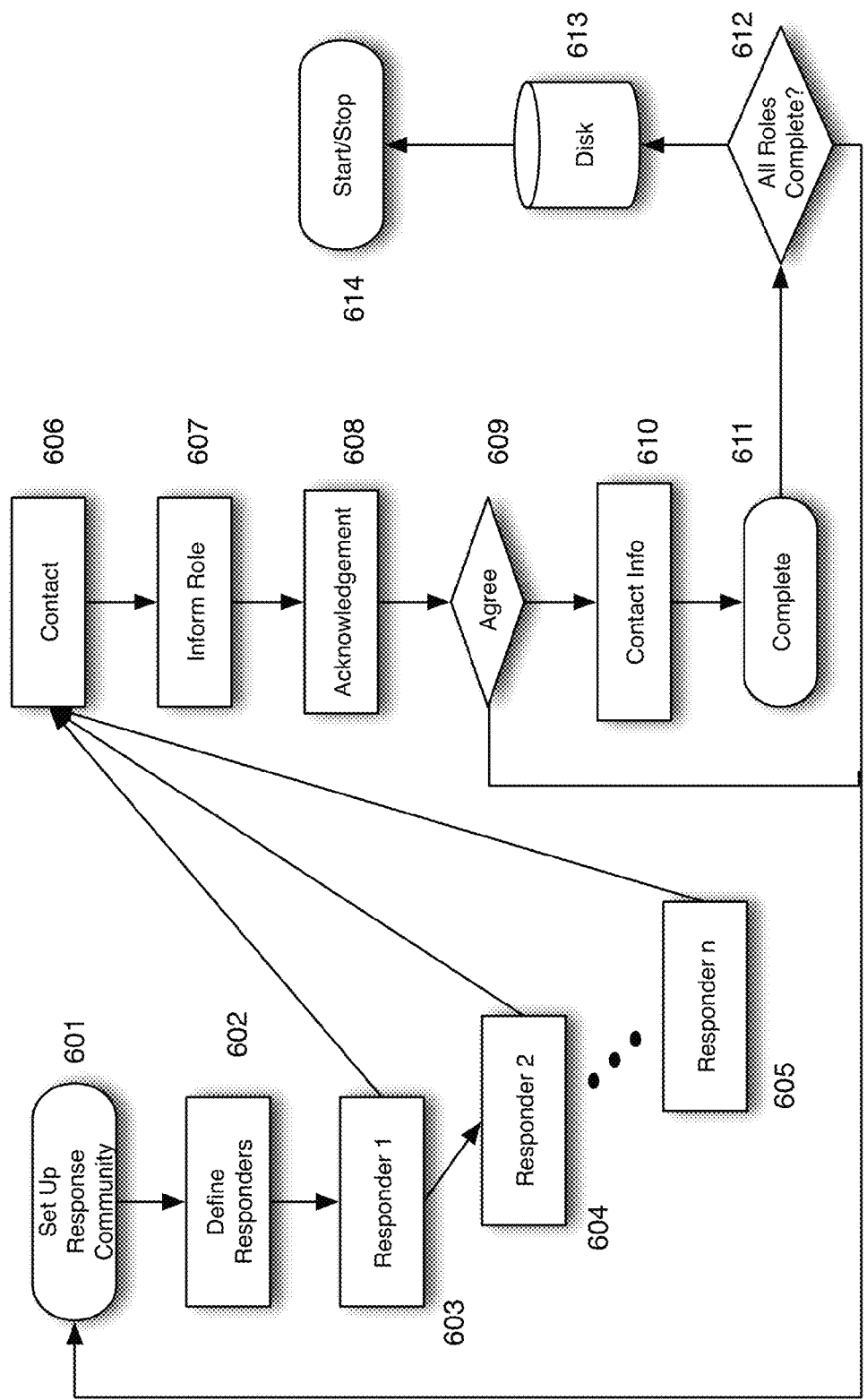
FIG. 6 is a flow chart for methods for set up of multiple users in an interconnected group of users.

In another embodiment shown in FIG. 6 a community of users is defined. A community of users may be defined for each user of the alert device and system. A community of users is a group of users who agree to respond to alerts and communications from a first user and in many cases the content of the alert message or communication and the content of their response are preprogrammed into the system.

A first user starts 601 to define a response community by first selecting set of responders 602. Selecting implies providing contact information for the responder and defining roles for each responder. Nonlimiting example of roles include a responder to whom particular information is sent, a responder to whom an emergency alert is sent, a responder who is the first person an emergency alert is sent. Once each responder is defined 602, a setup process for each responder is initiated 603, 604, 605. The responder is contacted 606. In one embodiment the contact is an automatic pre-defined email sent to the responder. In another embodiment the contact is an automatic text message and in another embodiment the contact is an automatic phone call. The responder is informed 607 of their selected role with respect to the user and then the responder acknowledges 608 the contact and if the responder agrees 609 to the selected role their contact information to be used in the role is confirmed and or defined 610. The contact information includes the communication path by which that particular responder will be contacted when an alert is sent. Nonlimiting examples include a responder who is to receive an emergency call for help may be contacted by a phone call and or text message and/email message. This way redundant communications are sent in an emergency situation. A responder whose role is to receive a non-urgent message may be contacted by all three methods (phone, text and email) or might be contacted by only one of the communication paths. Defining and acceptance of the role and defining the communication path(s) means that the selection of that responder with that particular role is complete 611. In one embodiment completion 611 includes contacting the responder through the now defined communication path as a confirmation that the path is operational. That is a test run of the alert system is done to confirm that the role and the communication path work. If the responder does not agree 609 to the role the process returns to the start 601. Once the responder is set up the system queries 612 whether all responders have been set up and whether all roles are complete and if so all data is stored 613 and the setup process is stopped 614. Note the flow chart is general and for illustration purposes. Variations to the embodiment show are possible and likely. Storage is likely to happen for each individual responder as they are set up and not after completion of all responders. Process steps 606-614 are completed for each selected responder 1 through n 603, 604, 605.

Figure 7:
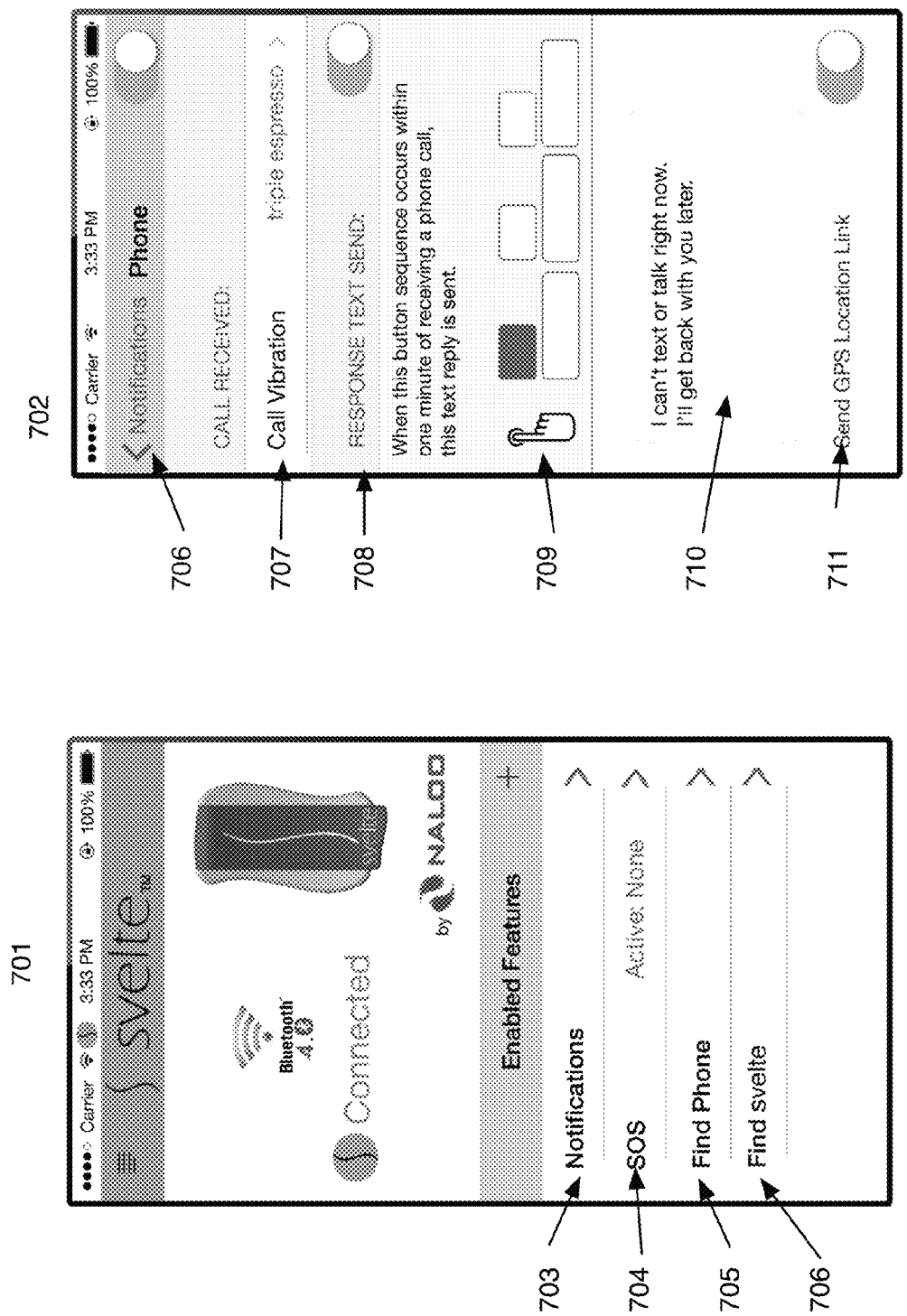
FIG. 7 is a screen image for methods of setting up the system for a notification.

FIG. 7 show further embodiments of the setup processes. The images 701, 702 depict screens a user will see during a setup process. The first screen 701 shows a selection of features that may be enabled. Features include notifications 703, an emergency alert 704, a feature to find a lost phone 705 and a feature to find a lost alert device 706. In the preferred embodiment the personal communication device includes a touch sensitive screen and the user selects the feature by touching the words on the screen. Selection results in appearance of a second screen image to provide the user means to input the detailed parameters to enable the selected feature. In the example shown the second image 702 is a screen shown to the user to set up a notification feature. The notification in this case is notification to the user of an incoming phone call. The notification may be specific to a particular caller or may be a notification that is general, that is a response that could be sent to any caller. The second image 702 shows 706 the type of feature that is being setup. The call notification feature includes the type of alert 707 to be used with the alert device. In this case the alert device is to vibrate with a pre-selected vibration pattern here entitled triple espresso. The embodiment further includes a switched selection 708 to send a text message response to the incoming phone call based upon an encoded 709 pattern of buttons the user will push on the user interface of the alert device. In the example shown the user interface is defined as a series of button pushes that will result in a particular action. The example shown 709 uses a single short duration button push to result in a text message being sent with the pre-selected content 710. In another embodiment the user may also send their current location by selecting 711 whether GPS data should also be sent with the text message.

Figure 8:
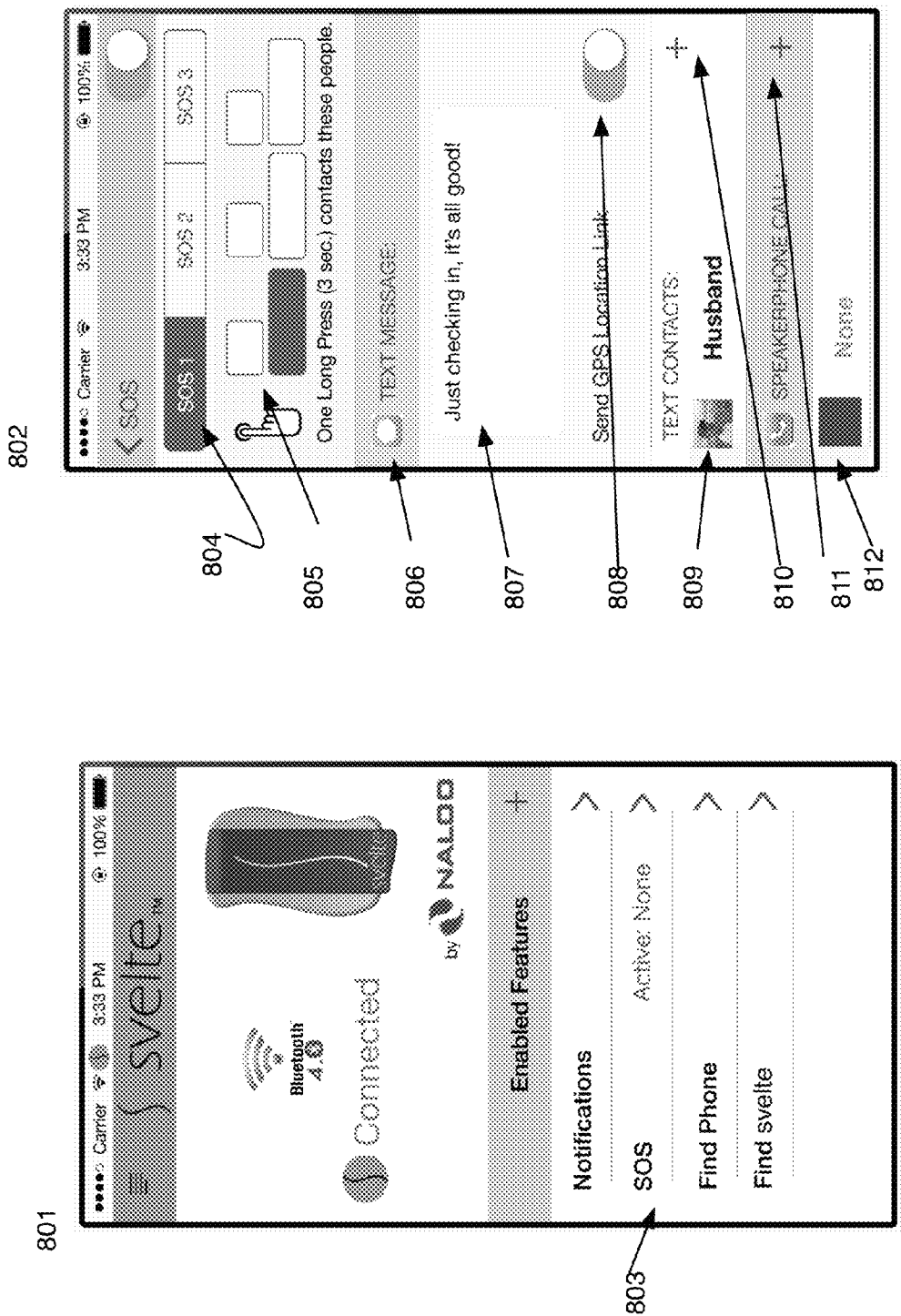
FIG. 8 is a screen image for methods of setting up an emergency alert.

In another embodiment shown in FIG. 8, the setup process for another alert is shown. The first image 801 shows the screen image on a portable communication device for selection of the particular feature 803 here defined as an emergency alert or SOS. The second image 802 is a screen image on a portable communication device showing setting the parameters for the alert feature. The user can select from a list of alerts 804 each of which would have a coded interaction 805 with the alert device. In the example shown a first alert SOS1 is selected and will be activated when the user does a single long press of a button on the user interface of the alert device. The example action shown here is a text message 806 is to be sent with pre-selected content 807 that further includes the users location 808. The alert text message is to be sent to selected users 809. Additional users may be added 810. The alert may also optionally include making a phone call. By selection of the phone call option 811 and inclusion 812 of the call information. In the example shown no phone call is to be made with this particular alert. In summary the alert shown is setup such that a single long press of a button on the alert device results in a text message being sent to contact identified as Husband 809 with the contents 807 of "Just checking in, it's all good." The contact information required to send the text message to Husband is contained in a separate database on the portable communication device as is known in the art.

Figure 9:
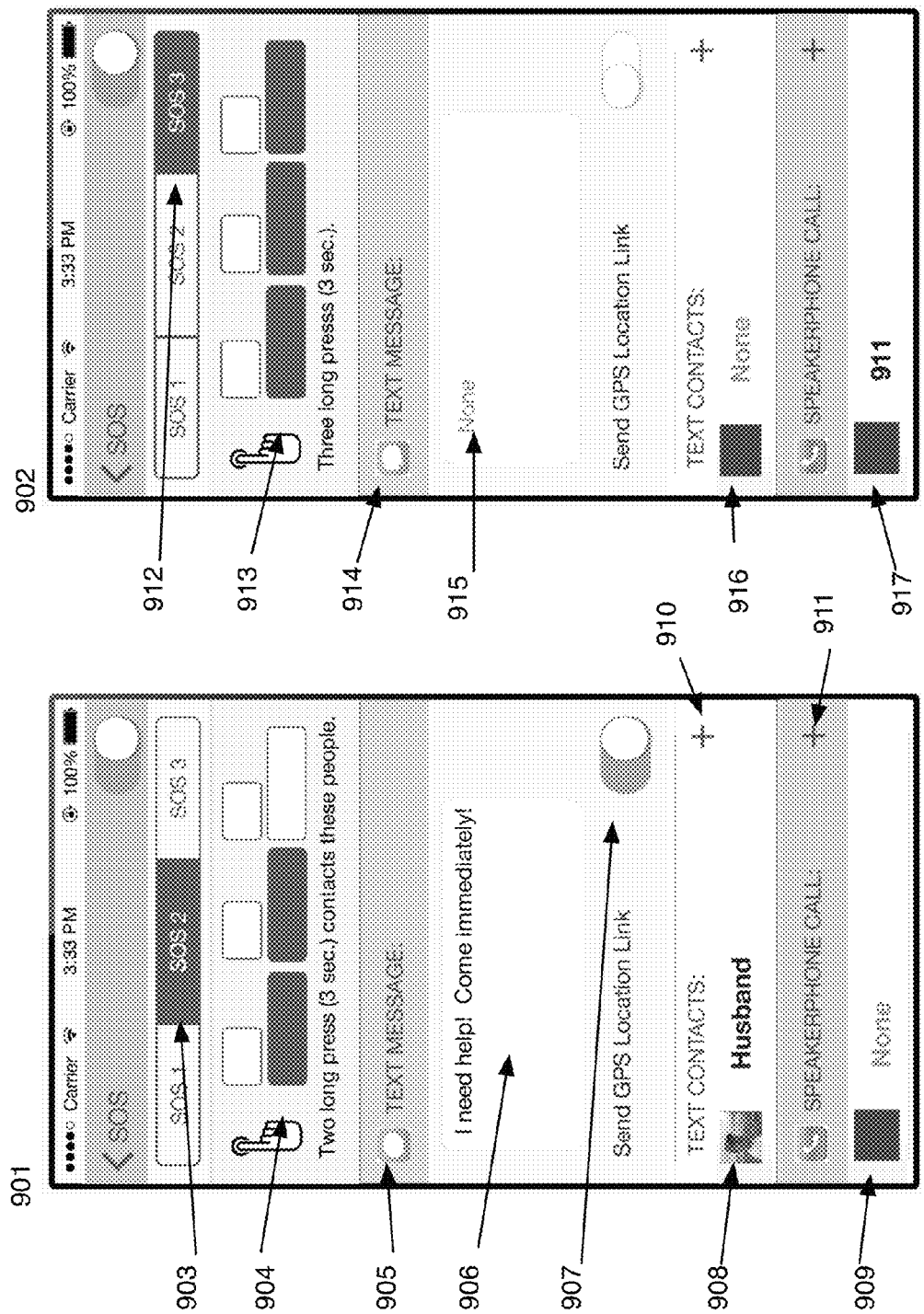
FIG. 9 is a screen image for methods of setting up a series of emergency alerts.

Nonlimiting example setup processes for two additional alerts are shown in FIG. 9. In a first example 901, an alert selected 903 as SOS 2 is encoded 904 to be activated with two long presses of the user interface on the alert device. The user can select and setup multiple alerts. In the example shown there are three alerts available. The alert is selected 905 to send a text message to a selected contact "Husband" 908. Additional recipients can be added 910. The content of the alert message is entered 906. The alert can further included making a phone call through selection 911 of that option. Here no phone call is selected 909.

In another example embodiment shown in screen image 902 of the portable communication device, an alert labeled SOS 3 912 is setup to be initiated 913 with three long presses of a button on the user interface of the alert device. The alert is setup to not include a text message 914, 915 and there is no contact information 916 included. This particular alert is defined to make a speakerphone call 917 to the number 911. In the example shown the alert SOS 3 is an emergency alert set to causes the portable communication device to make a speaker phone call to the emergency number 911 upon three presses of a button on the user interface.

In the examples of the setup for alerts shown in the previous figures, a community of users is defined to send predetermined communications to each other. The setup includes defining messages, message content and contact information for each user. In one embodiment the setup process includes receiving a confirmation from the intended recipient of a communication that they agree to receive such communication and if apropos will respond. In the preferred embodiment the setup is accomplished through use of a program running on a portable communication device that is paired, that is in electronic communication, with an alert device. In the examples shown the setup communication is initiated through a pre-selected interaction with the user interface on the alert device. In this manner a phone call, text message or any other capability of the portable communication device can be initiated through interaction solely with the alert device. In the examples shown the user interface on the alert device is a button that can be pushed in patterns having a number of pushes and duration that encode for the particular event to be triggered on the portable communication device. The user interface on the alert device is not limited to a button or series of buttons, but can be any interface by which a user's action can be encoded to relate to a set of actions to be initiated. Nonlimiting exemplary user interfaces include touch screens, switches such as slider switches, rotary knobs, touch screens that respond to a variety of user interactions as are known in the art, a microphone and associated program to recognize a sound or spoken words, a camera that can detect a motion or other visual clue and a motion sensor. In one embodiment the user interface includes an accelerometer and an alert is initiated on the basis of the acceleration of the alert device exceeding a pre-selected value.

Figure 10:
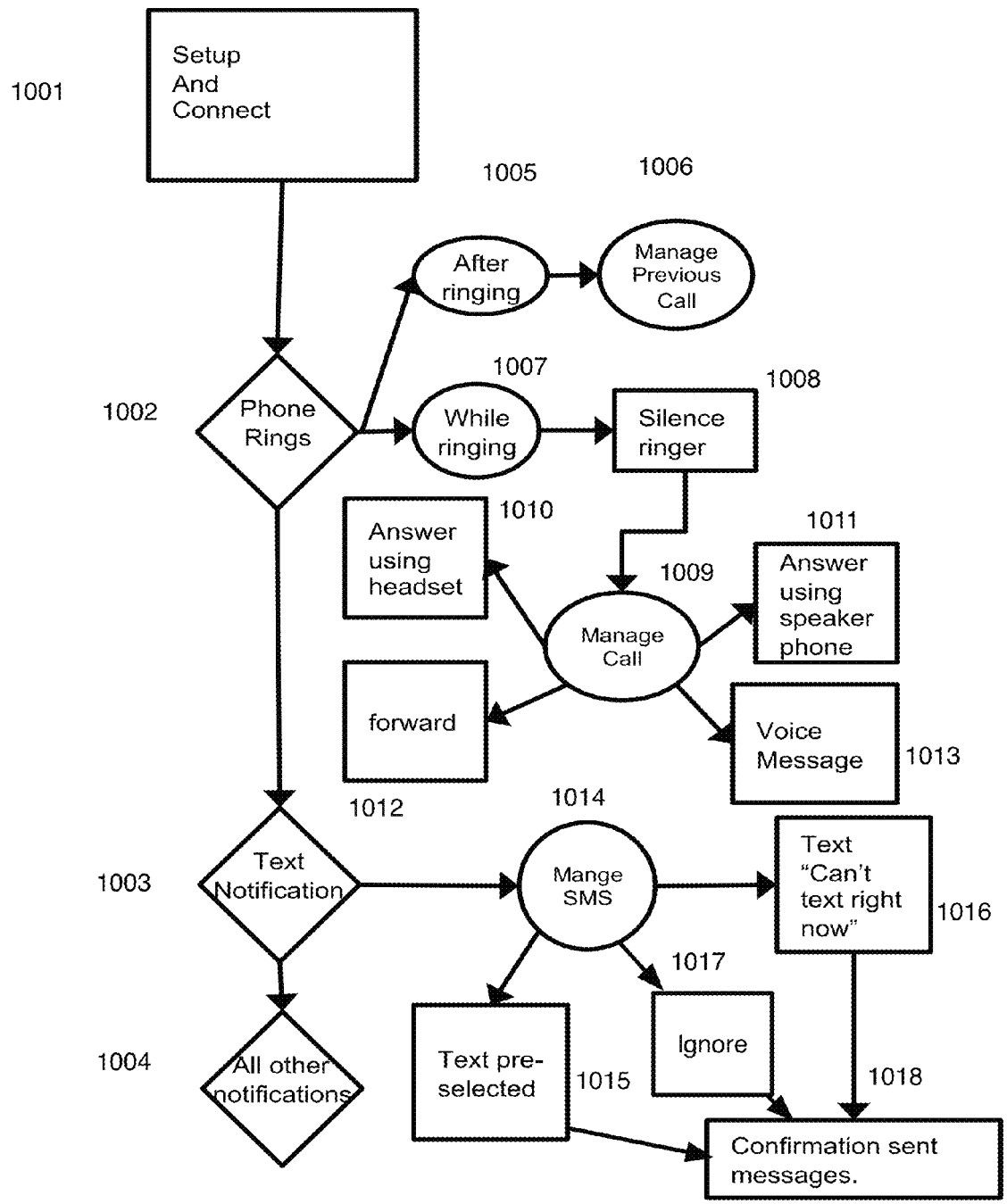
FIG. 10 is a flow chart for using the device and system for notifications.

Referring now to FIG. 10 embodiments are shown that describe use of the alert device and system from the perspective of receiving and reacting to a communication from a second user. The use of the system is initiated 1001 through a setup and connect process that includes defining preselected events to be initiated on the portable communication device upon its receiving a communication and the user responding in a preselected method through interaction with the user interface on the alert device. Setup and connect also includes pairing of the alert device with a portable communication device such that the two devices can send and receive electronic signals from one another. In the preferred embodiment pairing includes a wireless link using Bluetooth® technology. The flow chart of FIG. 10 further shows programmed response scenarios for particular communication events received by the portable communication device. In a first example the system is watching 1002 for a phone ring and if detected follows response scenarios 1005 and 1007. The system also includes programmed means to alert the user through the alert device of a particular communication. In the preferred embodiment the portable communication device and the alert device are programmed to send a particular signal to the user through the alert device. The signal is unique to the type of incoming communication and therefore informs the user that a communication has been received and the type of communication that is received. Nonlimiting examples of the specific alert include the frequency and duration of a vibration of the alert device. In one example a continuous vibration at a preselected frequency and/or intensity informs the user that an incoming phone call has been received. In another example the frequency and intensity informs the user that an incoming call has been received and that the call is an emergency call for help from one member of the community of users to which a user may subscribe. If the user responds by interacting with the alert device while the portable communication device is ringing 1007, the signal from the alert device causes the portable communication device to stop ringing 1008 and then manages the call 1009 by initiating any of a series of preselected scenarios. The particular scenario selected is based upon the setup procedure and the interaction of the user with the user interface on the alert device. Nonlimiting exemplary responses shown include answering the call using a headset 1010, answering the call using a speakerphone 1011, forwarding the call to a third party 1012 and leaving a voice message 1013. In one example the voice message response is preselected during a setup process as described above. The particular user interaction and associated response is defined during the setup process. For example a single push of a button on a user interface on the alert device might be programmed to cause the portable communication device to answer the incoming phone call and route the answer through a headset 1010 connected to the portable communication device. Two pushes of a button on the user interface on the alert device might cause the portable communication device to answer the call using a speakerphone 1011. Three pushes of a button on the user interface on the alert device might trigger the portable communication device to forward the incoming phone call to a third party. Four pushes of a button on the user interface on the alert device might cause the portable communication device to respond with a recorded voice message 1013.

Continuing in FIG. 10 the system further watches 1003, 1004 for other forms of communication coming into the portable communication device. In another example upon receiving a text message the portable communication device, the alert device and the portable communication device are programmed to alert the user of the text message. In one embodiment an output device is activated on the alert device. Nonlimiting examples of the output device include a vibrating device, a buzzer, a light and a speaker. The alert can be specific to the type of communication and specific to the sender of the communication or both. The type of communication may be defined as a text message or any other form of electronic communication received by the portable communication device. Once the type of communication is identified by the data sent along with the electronic communication 1003. In the example shown the communication is identified 1003 as a short message service (SMS) text message. The process continues on to manage the received SMS based upon parameters selected during the setup process. Example responses include sending a response text message 1016 that the receiver cannot respond right now, sending a different text response with customized content 1015 or simply ignoring the message 1017. The response may be triggered automatically or in a preferred embodiment the response is selected based upon the user interaction with the alert device wherein a preselected series of button pushes results in the particular response 1015, 1016, 1017 to be selected. Once the selected response is sent a confirmation 1018 informs the user that the response communication has been sent. The confirmation alert may be a buzz, vibration, tone, light or image on a screen on the alert device that is programmed to be a confirmation alert to the user.

Other forms of communication 1004 received by the portable communication device are handled similarly: the user is alerted that there is an incoming communication through an action of the output or notification device incorporated into the alert device and the user triggers a response by interaction with the user interface, the response is sent and the user receives a confirmation alert through the alert device.

Figure 11:
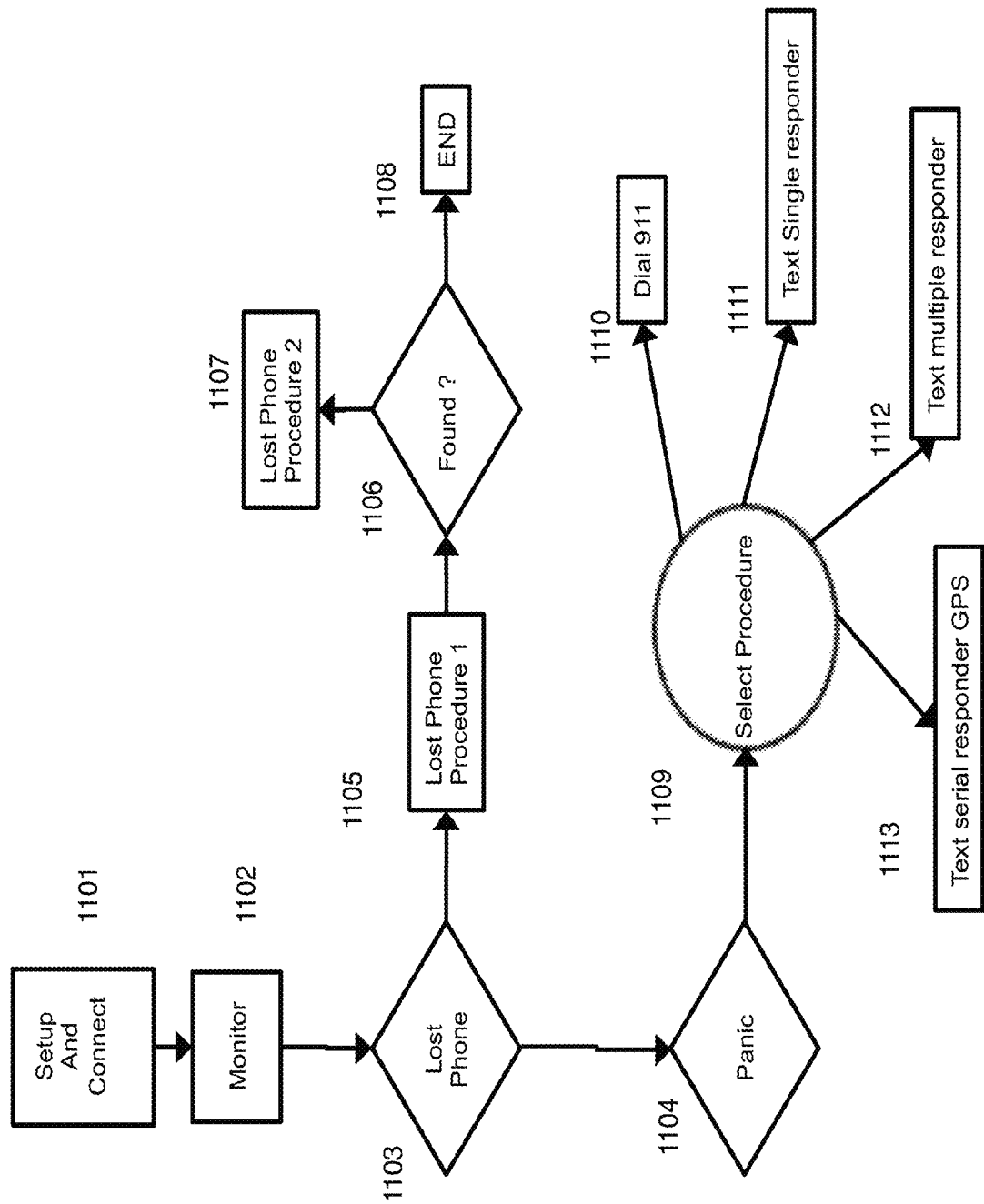
FIG. 11 is a flow chart for using the device and system for alerts including finding a lost device and emergencies.

The communications discussed in conjunction with FIG. 10 are events triggered by an incoming communication received by the portable communication device and a programmed response is initiated by interaction with the alert device. In other embodiments shown in FIG. 11 communications are initiated by the user through interaction with the alert device. In one embodiment the portable communication device and the alert device are setup/programmed 1101 through processes already discussed. The connect process is an electronic pairing of the alert device with the portable communication device. The process continues through monitoring 1102 for an action by the user though interaction with the alert device where the action is a preselected action on the alert device that sends a signal to the portable communication device which upon receipt of the signal takes particular preselected/programmed actions. Monitoring 1102 includes monitoring for an action by the user through their interaction with the alert device and monitoring on the portable communication device for an electronic signal from the alert device. Two exemplary alerts 1103, 1104 are shown in FIG. 11. In the first embodiment 1103 the user initiates an action on the alert device that is programmed to start a lost phone procedure 1105. Although described as a lost phone procedure the embodiment would encompass procedure to find any portable communication device that is electronically linked to the alert device. The procedure initiated includes a first procedure 1105 initiated once a lost phone signal is received from the alert device a test 1106 as to whether the phone has been found. If not found a second procedure 1107 is initiated and if found a finish procedure 1108 is initiated. Additional procedures (not shown) can be included based upon sequences analogous to 1105, 1106, 1107 and 1108. In one embodiment the first lost phone procedure 1105 causes the phone to vibrate thereby not causing attention drawn to a phone that may be "lost" on the person of the user. The second lost phone procedure 1107 is an escalation where the portable communication device is programmed to issue a louder notification to the user. In one embodiment, the test of found 1106 includes a questioning alert to the user as to whether the phone has been found and an answering response from the user as to whether the phone has been found. The questioning alert and the response are selected during the setup procedure 1101. Further escalation procedures (not shown) may include remotely disabling the phone if it cannot be found.

A second embodiment of an alert procedure initiated by the user through the alert device includes an emergency alert or a panic button 1104. A preselected button push or series of button pushes as determined during the setup procedure discussed above are programmed on the alert device to send a particular electronic signal to the portable communication device and the portable communication device is programmed to respond in a preselected and pre-programmed manner. A series of button pushes is recognized as an emergency sequence 1104 and the particular procedure for the selected series of button pushes is encoded during setup as already discussed in conjunction with FIGS. 8 and 9 and selected when using initiating an alert. In one embodiment the series of button pushes causes the alert device to send an electronic signal to the portable communication device causing it to dial 1110 an emergency number such as 911. In another embodiment the series of button pushes is encoded to cause the alert device to send an electronic signal to the portable communication device causing it to send a text message 1111 to a single responder. In another embodiment the alert device is programmed to respond to a particular interaction with the user interface on the alert device by sending an electronic signal to the portable communication device causing it to send text messages to multiple responders 1112. In another embodiment the multiple responders are part of a response community selected and setup during the setup procedure. In another embodiment the particular interaction with the user interface on the alert device causes it to send an electronic signal to the portable communication device that in turn sends a text message to a series of responders 1113. In another embodiment the series of responders are part of a response community as discussed above in conjunction with FIG. 6. In another embodiment the procedures 1110, 1111, 1112, 1113 include an escalation process that includes a first step, a response from the first step and a second step selected on the basis of the response to the first step. Escalation process embodiments are show in FIGS. 12-16.

Figure 12:
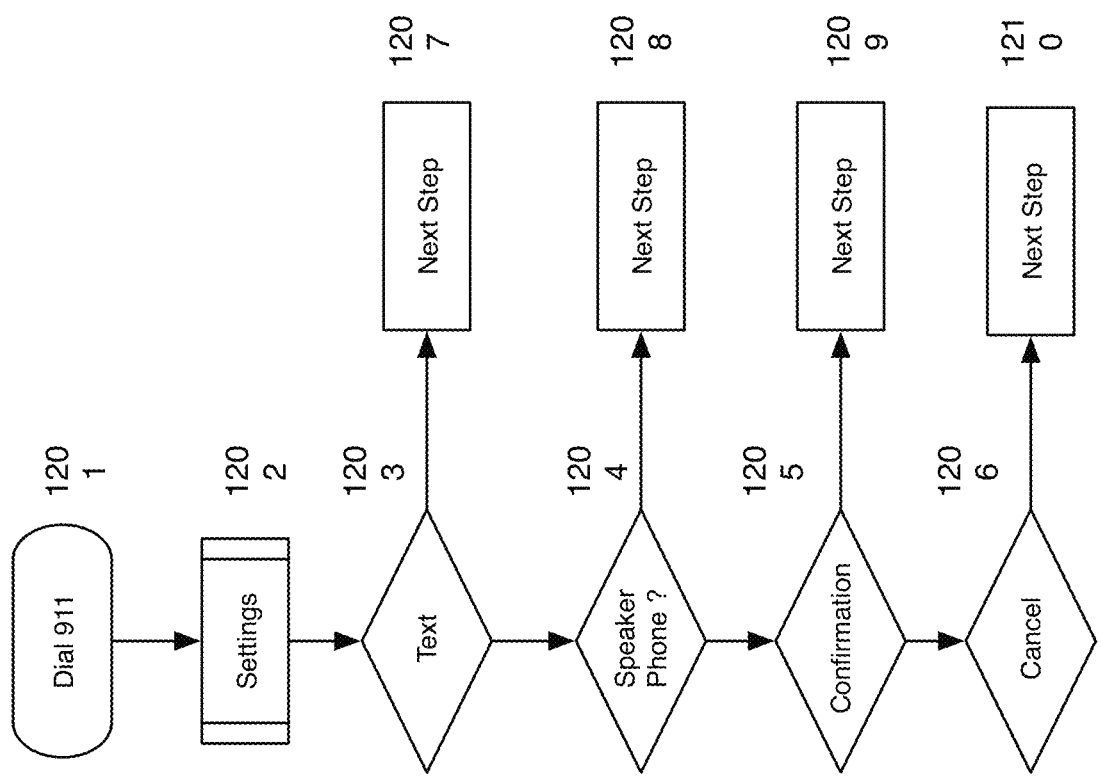
FIG. 12 is a flow chart for using the device and system for an emergency alert.
Figure 13:
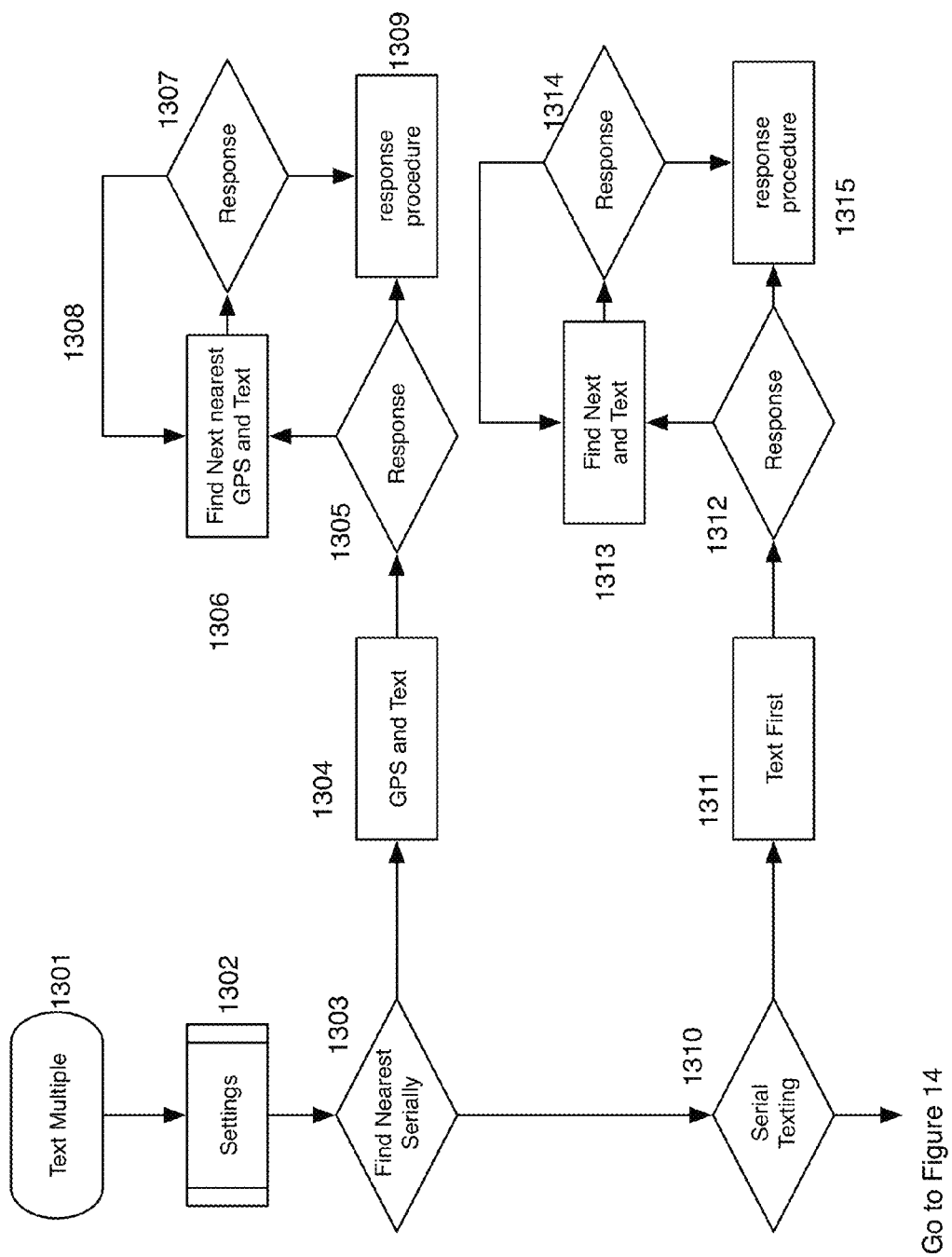
FIG. 13 is a flow chart for using the device and system for emergency alert procedures using GPS and for a sequence of text messages.

Referring now to FIG. 12 details of an alert embodiment that includes dialing an emergency number such as 911. The process begins 1201 with the user interacting with the user interface on the alert device. In a preferred embodiment the interaction includes pushing a user interface button a preselected number of times each for a preselected duration. Initiating the dial 911 alert causes the alert device to send an electronic signal to the portable communication device that then checks settings 1202 and takes a series of steps that have predefined through the setup procedure. Although shown in the Figure as a series of tests the actual implementation is to read a settings data file and take the actions indicated in the data file. In one embodiment the settings include sending text message 1203 with a series of steps 1207 to be taken in conjunction with sending a text message. The series of steps may include waiting for a response to a first text message and if not received within a preselected period of time sending a second text message. The second text message may be to the same person or multiple people or to a different group of people. In the preferred embodiment the text message is sent to members of the user's response community in a pre-selected order as already discussed. The setting may further include actions with respect to a speakerphone 1204. These actions include activating the speakerphone functionality on a portable communication device before or after dialing a preselected emergency number. In another embodiment the speakerphone functionality may have additional steps 1208. Such steps may be to make a first call without the speakerphone and to make a second call with the speakerphone. In another embodiment the speakerphone is activated on the basis of a response to a first phone call. In another embodiment the dial 911 procedure further includes a confirmation step 1205. The confirmation step includes a confirmation by the user through the alert device that the dial 911 procedure has been acknowledged. In one embodiment the confirmation by the user includes the user's interaction with the user interface on the alert device through a pre-selected action. In a preferred embodiment the interaction includes pushing a button or series of buttons that has been pre-selected to user for confirmations. The confirmation step may lead to next steps 1209. In one embodiment a positive confirmation may result in stopping the procedure. In another embodiment a confirmation that the dial 911 procedure was not satisfactory may lead to an escalation procedure that triggers additional communication actions through the portable communication device. In another embodiment the dial 911 procedure further includes a cancel procedure 1206. If the user decides that the dial 911 procedure is no longer necessary they may activate the alert device through a pre-selected user interface interaction to cancel the dial 911 procedure. The cancel procedure includes activating next steps 1210 that may include sending text or other communications through the portable communication device that all is OK and there is no need to respond.

In another embodiment shown in FIGS. 13 through 16 an alert process for a preselected group of responders that form a community of responders is shown. In a first embodiment shown in FIG. 13 a text message to multiple responders is sent. The steps of the procedure are selected through a setup procedure discussed above. The first step is to activate 1301 the procedure through interaction with the user interface on the alert device. The activation procedure reads the settings 1302 stored on the alert device and from the settings sends a signal to the portable communication device that is in electronic communication with the alert device. There too the settings on the portable communication device are read 1302 to determine the pre-selected steps in the procedure. Embodiments of procedures 1303, 1310, 1401, 1407 are included in FIGS. 13 and 14. Each are considered in turn. In a first embodiment that starts at find nearest serially 1303 a responder community has been set up through processes already described. The find nearest serially process 1303 accesses GPS data available through the portable communication device from each responder in a community of responders. The user that is closes to the user that initiated the process is sent a text message 1304. The process then waits for a response 1305 for a preselected period of time if no response is received during the preselected period of time or if a response that indicates the responder is not willing or able to interact the next nearest responder is found and sent a text message 1306. Again a response is awaited and similarly acted upon 1307. A positive response proceeds to a finishing step 1309. No response or a negative response proceeds to find the next nearest responder 1308, 1306. A positive response may lead to conclusion of the process 1309. A negative or no response from all users may initiate a process where the responder community is polled again except that those with negative responses are excluded. The steps included in the conclusion process 1309 are defined through the setup process and may include halting the process, sending additional text messages, and initiating other communication processes discussed throughout this application.

In another embodiment of multiple text procedures a series of text messages 1310 may be sent. As already described a signal from the alert device is preselected to initiate the serial text procedure 1310. The procedure includes the steps of selecting a first user in a responder community list and sending a first text message 1311. The process continues as in the Find nearest serially procedure of 1303-1309 except that no response or a negative responder results in sending a message to the next responder in an ordered list rather than selecting the next nearest responder via GPS. The process continues 1313, 1314 down the list of selected responders until all have been tried or a positive response is received to initiate a response procedure. The response procedure concludes 1315 if a positive response is received. Conclusion 1315 may include halting the process, sending additional text messages, and initiating other communication processes discussed throughout this application. The particular response procedure is determined during the setup process.

Figure 14:
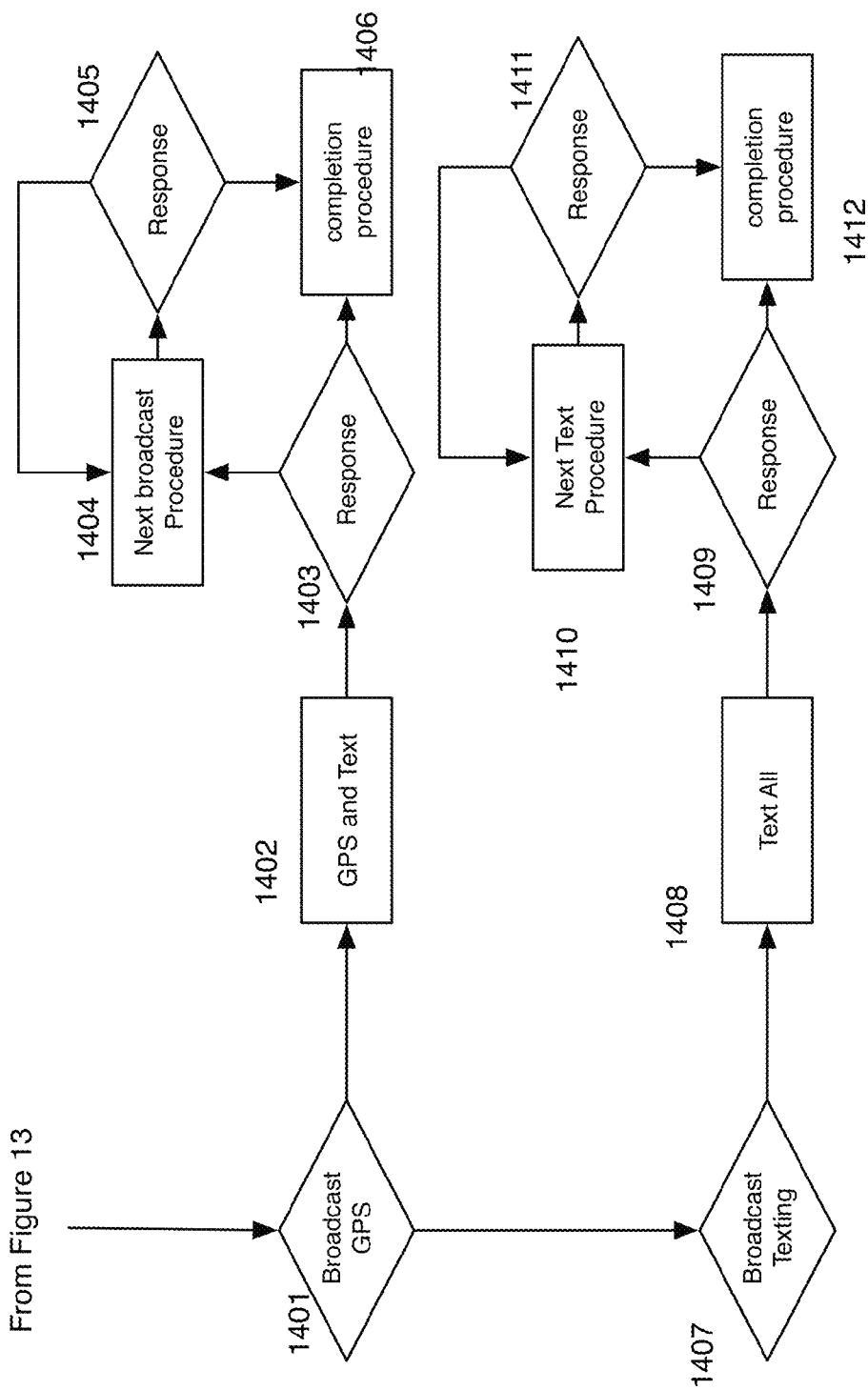
FIG. 14 is a flow chart continuation of FIG. 13 for using the device and system for additional emergency alert procedures.

Referring now to FIG. 14 and continuing with communications to groups of users another embodiment 1401 includes a broadcast of GPS to a pre-selected group of responders. In this embodiment the location of the user and a text message is sent 1402 to a pre-selected group of users, a community of responders. A test for a response is made 1403 with a selector to either a next broadcast procedure 1404 based upon a negative or no response or a completion procedure 1406 based upon a positive response. No response means that no acknowledgement of the response is received on the portable communication device of the sender within a pre-selected time interval after sending the message 1402. Non-limiting examples of the next broadcast procedure include broadcasting GPS and text communication from the portable communication device to a second selected group of responders, broadcasting GPS and text communication from the portable communication device to the same set of selected group of responders, dialing a pre-selected phone number, and dialing 911. Non-limiting examples of the completion procedure include dialing a pre-selected phone number where the pre-selected phone number is that for the member(s) of the community of responders who responded positively and ending the process. The next broadcast procedure is further tested 1405 for a positive response with a subsequent next broadcast procedure followed until a positive response is obtained at which point the completion procedure is executed.

Another embodiment includes a broadcast text message 1407. In this procedure similar to the previous a text message without GPS data is sent 1408 to a community of responders. The response is tested 1409 for a positive response from at least one of the recipients and the results of the test result in either a next text procedure 1410 on a negative or no response or a completion procedure 1412 on a positive response. Non-limiting examples of the next broadcast procedure include broadcasting a text communication from the portable communication device to a second selected group of responders, broadcasting a text communication from the portable communication device to the same set of selected group of responders, dialing a pre-selected phone number, and dialing 911. Non-limiting examples of the completion procedure include dialing a pre-selected phone number where the pre-selected phone number is that for the member(s) of the community of responders who responded positively and ending the process. The next broadcast procedure is further tested 1411 for a positive response with a subsequent next broadcast procedure followed until a positive response is obtained at which point the completion procedure is executed.

Figure 15:
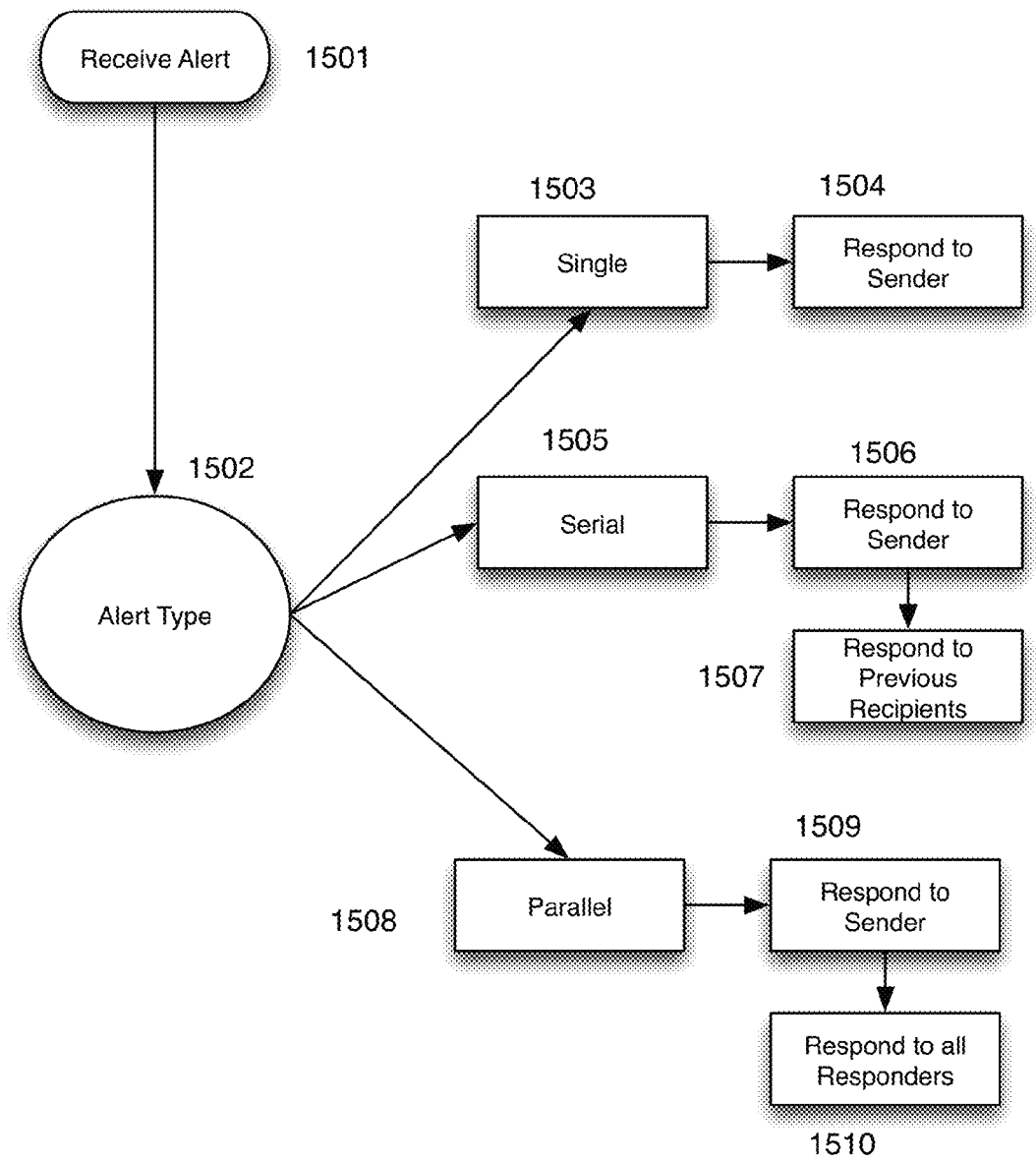
FIG. 15 is a flow chart from the perspective of the receiver of an emergency alert.

Referring now to FIG. 15 an embodiment of the alert process from the perspective of the receiver of an alert is shown. The user has been selected as a member of a community of responders and has acknowledged that they will respond in the case of an alert message from other users in the community through setup procedures discussed above. The user's portable communication device receives an alert 1501 from a second user in the responder community. The alert is further transmitted to the alert device. In one embodiment the portable communication device tests for the type of alert 1502 and then selects a response based upon the alert type and the user's interaction with the alert device through the user interface on the alert device. In a preferred embodiment the user interaction includes pushing a button on the alert device where the button push is encoded to initiate a pre-selected response. The button push includes a duration and number of pushes to encode a particular response where the duration and number of pushes and the connection to the pre-selected response are determined during the setup procedure. The user interaction with the alert device triggers a response based upon the type of alert received. If the alert is a communication from a single user 1503 a preselected response 1504 is sent to just that user. If the is a communication that is sent to a serialized list of users 1505 a response, triggered by the alert device, is sent 1506 to the sender of the communication and is sent 1507 to other users in the serialized list. In a preferred embodiment the response is sent to users that are in the same list of responders and who have been contacted prior to the recipient. In such a process then the other users already contacted will know a response has been sent and also know the nature of the response. In this manner a user in the community of users can be assured a positive response is received by the sender and can also change their response if all other users in the series respond negatively.

Similarly if it is determined 1508 that the alert is sent by a first user in parallel, i.e. a broadcast message to a group of community responders sent simultaneously, the recipients interaction with the alert device will trigger a response sent to the sender 1509 and to all others 1510 who received the communication.

Figure 16:
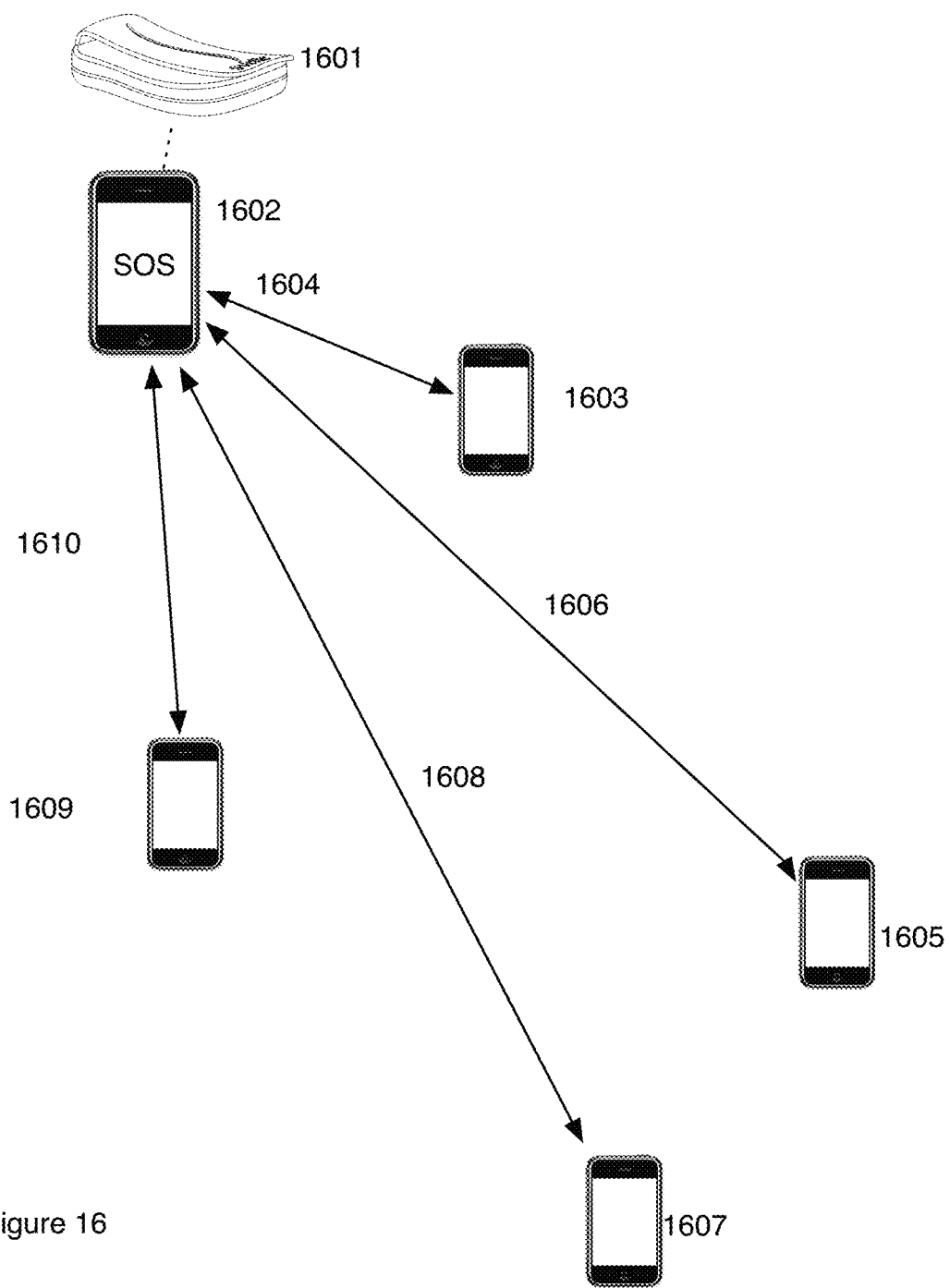
FIG. 16 is a block diagram illustrating a nearest neighbor emergency alert procedure.

FIG. 16 shows a block diagram of an alert where the recipient(s) of the alert in a community of responders is selected based upon their location. A first user interacts with the user interface on the alert device 1601 that in response to the interaction sends an electronic signal to a portable communication device 1602 that is electronically linked to the alert device. In one embodiment the portable communication device 1602 then polls the portable communication devices 1603, 1605, 1607, 1609 of each other member of the community of responders and the devices respond with their location. The first portable communication device then calculates the distances 1604, 1606, 1608, 1609 between the portable communication device 1602 of the user who is sending the alert and the other users. In an embodiment where the user has pre-selected to send an alert serially to the users based upon their location the alert would first be sent to the nearest member 1603 of the community of responders, wait for a response and if no response or a negative response is received, then send the alert to the next nearest member 1609, again waiting for a response and if no response or negative send a message to the next nearest 1605 and following the same procedure finally send the alert to the member 1607 who is furthest away. In another embodiment where the first user 1602 through interaction with their alert device 1601 triggers a parallel broadcast of an alert, all members of the response community 1603, 1605, 1607, 1609 would receive the alert message simultaneously regardless of their distances 1604, 1606, 1608, 1610 from the first user 1602.

SUMMARY

An alert device and methods of using the device in conjunction with a portable communication device are presented. The alert device is intended to be worn discretely on the person of the user and includes an output mechanism and user interface such that the user is notified of incoming communications received by a portable communication device, such as a cellular telephone, and may trigger the portable communication device to send pre-selected responses to those communications through interaction solely with the alert device. The alert device may further initiate pre-selected communications to be sent by the portable communication device solely through interaction with the alert device.

What is claimed is:

1. A method for sending an alert message from a portable communication device said method comprising;
    a) pairing by a first user an alert device with a portable communication device thereby making them electronically connected, said alert device having a user interface, an output mechanism and an electronic input output port that enables the electronic connection with the portable communication device,
    b) selecting by the first user a user interaction on the user interface of the alert device,
    c) selecting a first electronic communication to be sent from the portable communication device when the selected user interaction is activated on the alert device and storing the electronic communication and the user interaction in an electronic memory of the portable communication device,
    d) selecting a plurality of second electronic communications to be sent from the portable communication device, at least one of said plurality of second electronic communications to be sent upon receipt of a response message by the portable communication device,
    e) selecting a plurality of second users each of whom have a portable communication device, wherein selecting includes sending an electronic communication to each of the plurality of second users requesting they respond to a future electronic communication and at least one of the plurality of second users sending a positive response electronic communication that they will respond to the future electronic communication,
    f) storing on the portable communication device of the first user a list of the at least one of the plurality of second users who have responded positively,
    g) then, after completing the steps a)-f), performing by the first user the selected user interaction on the user interface of the alert device thereby causing the alert device to send an electronic signal to the portable communication device of the first user and the electronic signal causing the portable communication device to send the first stored electronic communication to at least one of the stored list of the at least one of the plurality of second users who have responded positively.

2. The method of claim 1 wherein the portable communication device is a cellular telephone.

3. The method of claim 1 wherein the user interface is a button and the user interaction is a pressing of the button the pressing having a duration for the pressing of the button and a count of the number of presses with the duration.

4. The method of claim 1 wherein the pairing is a wireless pairing.

5. The method of claim 1 wherein the output mechanism is an electronic vibrating device.

6. A system for sending an alert message to a plurality of communication devices said system comprising:
    a) an alert device said alert device comprising
        i) a first surface and a second surface,
        ii) a user interface, iii) an output mechanism, and,
iv) an electronic input/output interface said interface capable of sending an electronic signal to a portable communication device,
b) the portable communication device comprising
i) a cellular telephone,
ii) a computer processor,
iii) computer memory,
c) said portable communication device including in the computer memory a program that will operate the computer processor to:
i) pair with the alert device thereby making them electronically connected,
ii) accept a selected user interaction of a first user on the user interface of the alert device,
iii) accept a selected first electronic communication from the first user to be sent from the portable communication device when the selected user interaction is activated on the alert device and store the selected first electronic communication and the selected user interaction in the computer memory of the portable communication device,
iv) accept a selected plurality of second electronic from the first user, said selected plurality of second electronic communications to be sent from the portable communication device, at least one of said plurality of second electronic communications to be sent upon receipt of a response message by the portable communication device, said plurality of second electronic communications stored in the computer memory of the portable communication device,
v) accept a selected plurality of second users from the first, said second users each of whom have a portable communication device, wherein accepting a selected plurality of second users includes sending an electronic communication to each of the plurality of second users requesting they respond to a future electronic communication, and, at least one of the plurality of second users sending a positive response electronic communication that they will respond to the future electronic communication,
vi) storing in the memory of the portable communication device of the first user a list of the at least one of the plurality of second users who have responded positively,
vii) then, after steps i)-vi), sending the stored first electronic communication to the stored list of the at least one of the plurality of second users when the first user performs the selected user interaction on the user interface of the alert device, thereby causing the alert device to send an electronic signal to the portable communication device of the first user, and, the electronic signal causing the portable communication device to send the stored electronic communication to the stored list of the at least one of the plurality of second users.

7. The system of claim 6 wherein the alert device is sized and shaped to fit under a bra worn by a user.

8. The system of claim 6 wherein the first surface is curved to fit snugly against the user's body and the second surface includes a user interface that may be accessed through a user's clothing and without the user having to look at the device.

9. The system of claim 8 where the first surface is designed to fit under the user's arm in a bra.

10. The system of claim 6 where at least one of the first surface and the second surface are removable and may be replaced with surfaces that include an attachment mechanism, said attachment mechanism selected from a clip, lanyard, and wrist band.

11. The method of claim 1 further including sending an electronic communication response to the first stored electronic communication, said response to the first stored electronic communication having content and sent from the at least one of the plurality of second users to the first user after receipt of the first stored electronic communication, and the communication device of the first user then sending at least one of the plurality of second electronic communications, said at least one of the plurality of second electronic communication selected on the basis of the content of the response to the first stored electronic communication.

12. The method of claim 11 further including receiving a positive response electronic communication that they will respond to the future electronic communication from more than one second user and wherein the first stored electronic communication is sent to a first of the second users and the at least one of the plurality of second electronic communications is sent to a second of the second users.

13. The method of claim 12 wherein the first of the second users and the second of the second users are selected on the basis of their geographical distance from the first user at the time of sending the first electronic communication.

14. The method of claim 12 further including an ordered list of the second users and the first stored electronic communication is sent to the first of the second users on the ordered list and the first stored electronic communication is conditionally sent to the second and subsequent of the second users on the ordered list, the sending to the second and subsequent of the second users on the ordered list dependent upon the content of the response to the first electronic communication received by the communication device of the first user said response sent by a second user in an earlier order on the ordered list.

15. The method of claim 11 wherein the electronic communication response to the first stored electronic communication from the second users is sent to all of the plurality of second users who have responded positively.

* * * * *